United States Patent [19]

Yamaguchi

[11] Patent Number: 5,015,102

[45] Date of Patent: May 14, 1991

[54] METHOD AND APPARATUS FOR MEASURING TEMPERATURE OF A LIVING BODY

[75] Inventor: Keiji Yamaguchi, Shimizu, Japan

[73] Assignee: Terumo Kabushiki Kaisha, Tokyo, Japan

[21] Appl. No.: 378,186

[22] PCT Filed: Oct. 23, 1987

[86] PCT No.: PCT/JP87/00816

§ 371 Date: Aug. 9, 1989

§ 102(e) Date: Aug. 9, 1989

[87] PCT Pub. No.: WO88/05161

PCT Pub. Date: Jul. 14, 1988

[30] Foreign Application Priority Data

Dec. 24, 1986 [JP] Japan ............................. 61-306357
Apr. 30, 1987 [JP] Japan ............................. 62-104483

[51] Int. Cl.⁵ ......................... G06F 15/42; G01K 3/00
[52] U.S. Cl. ................................. 374/107; 374/169; 364/413.03; 364/557; 128/736
[58] Field of Search ............... 374/102, 103, 107, 169; 364/557, 413.03; 128/736

[56] References Cited

U.S. PATENT DOCUMENTS

| | | | |
|---|---|---|---|
| 3,111,032 | 11/1963 | Wormser et al. | 374/169 |
| 3,280,312 | 10/1966 | Sandelien | 374/169 |
| 3,702,076 | 11/1972 | Georgi | 374/169 |
| 3,878,724 | 4/1975 | Allen | 374/134 |
| 3,878,728 | 4/1975 | Marzetta | 374/134 |
| 3,978,325 | 8/1976 | Goldstein et al. | 374/169 |
| 4,068,526 | 1/1978 | Goldstein | 374/169 |
| 4,092,863 | 6/1978 | Turner | 374/169 |
| 4,541,734 | 9/1985 | Ishizaka | 374/169 |
| 4,574,359 | 3/1986 | Ishizaka et al. | 374/169 |
| 4,629,336 | 12/1986 | Ishizaka | 374/169 |
| 4,648,055 | 3/1987 | Ishizaka et al. | 374/107 |
| 4,727,500 | 2/1988 | Jackson et al. | 128/736 |
| 4,811,198 | 3/1989 | Ota et al. | 374/169 |
| 4,843,577 | 6/1989 | Muramoto | 374/169 |
| 4,866,621 | 9/1989 | Ono | 374/107 |
| 4,878,184 | 10/1989 | Okada et al. | 374/107 |

FOREIGN PATENT DOCUMENTS

| | | | |
|---|---|---|---|
| 0234236 | 9/1987 | European Pat. Off. | 374/169 |
| 0027084 | 3/1978 | Japan | 374/169 |
| 0071919 | 5/1980 | Japan | 374/169 |
| 0125423 | 9/1980 | Japan | 374/169 |
| 0225325 | 12/1983 | Japan | 374/169 |
| 58-225326 | 12/1983 | Japan . | |
| 59-187233 | 10/1984 | Japan . | |
| 61-70429 | 4/1986 | Japan . | |
| 0283632 | 10/1970 | U.S.S.R. | 374/169 |

Primary Examiner—William A. Cuchlinski, Jr.
Assistant Examiner—Diego F. F. Gutierrez
Attorney, Agent, or Firm—Frishauf, Holtz, Goodman & Woodward

[57] ABSTRACT

A method and apparatus for measuring the temperature of a living body, providing a predetermined predictive functional formula in which the value of a shape parameter for reflecting the shape of a sensed temperature curve and the value of coefficient parameters for superimposing said prediction function on said sensed temperature curve are unknown. The temperature of a living body is sensed to obtain temperature data for subsequent processing, and elapsed time from start of temperature measurement is measured to obtain elapsed time data. The value of shape parameter is set on the basis of prescribed temperature data, and the value of coefficient parameters are set by solving simultaneous equations composed of a plurality of said predictive functional formula which includes said set value of shape parameter, and in which temperature data at a plurality of different points in time serve as purposive variables and functions of time data at the plurality of points in time serve as explicative variables. Sensed temperature that will prevail at a future time is calculated through prediction processing in accordance with the functional formula specified by said set value of shape parameter and coefficient parameters.

18 Claims, 31 Drawing Sheets

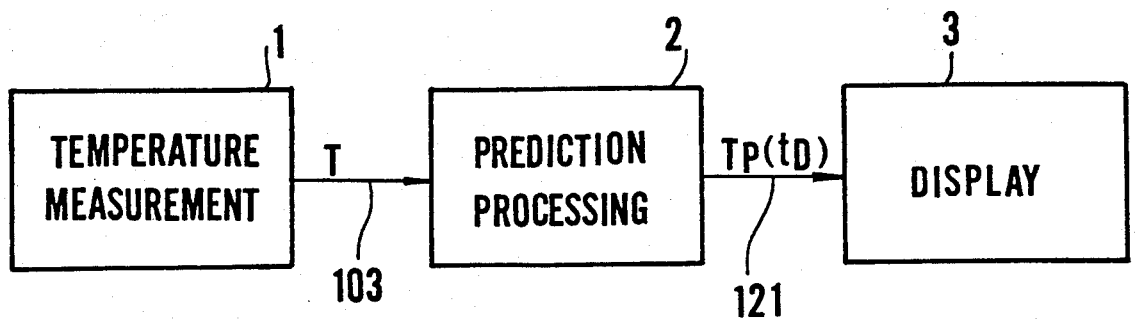
F I G. 1
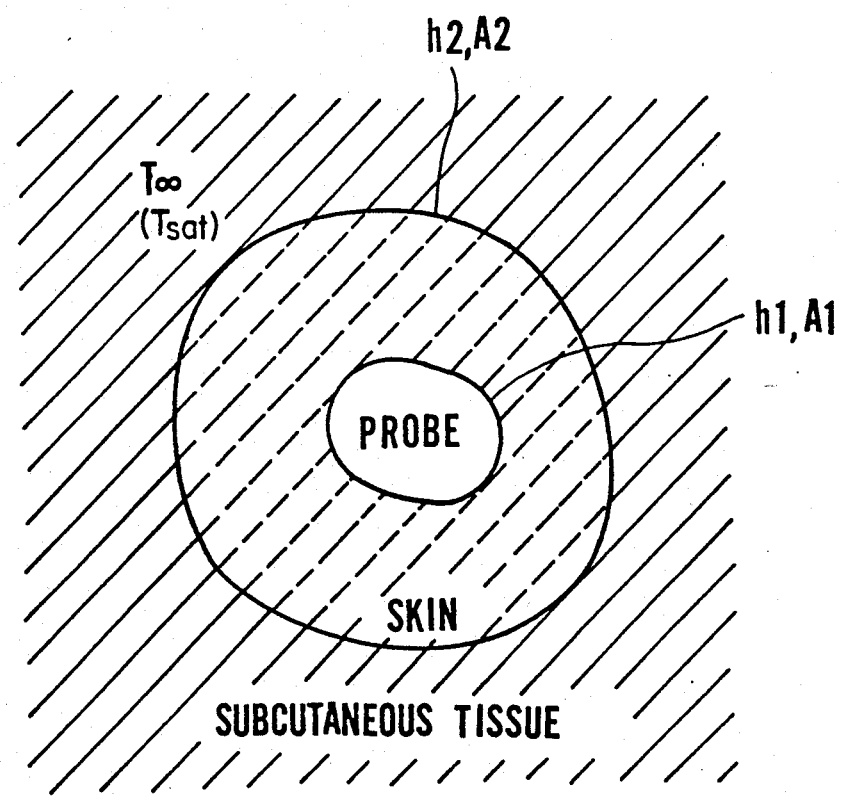
F I G. 7

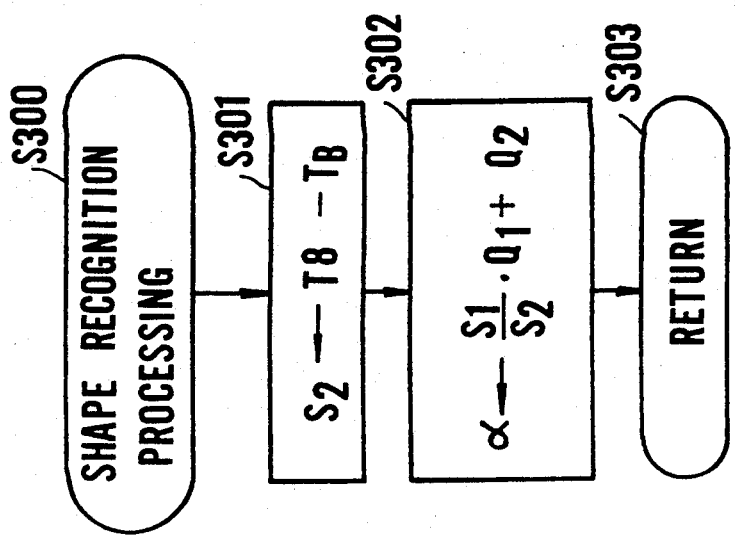
F I G. 4 (A)
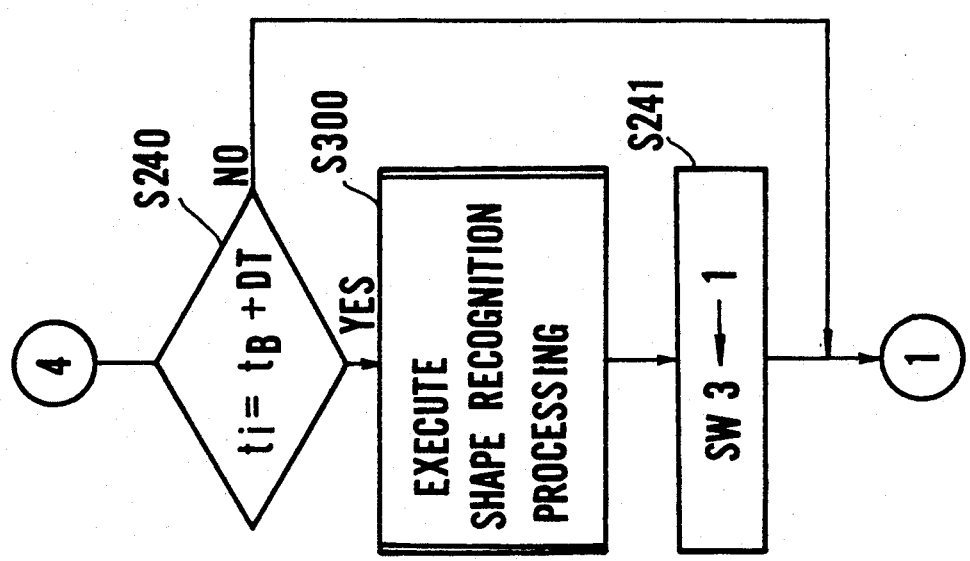
F I G. 3 (E)

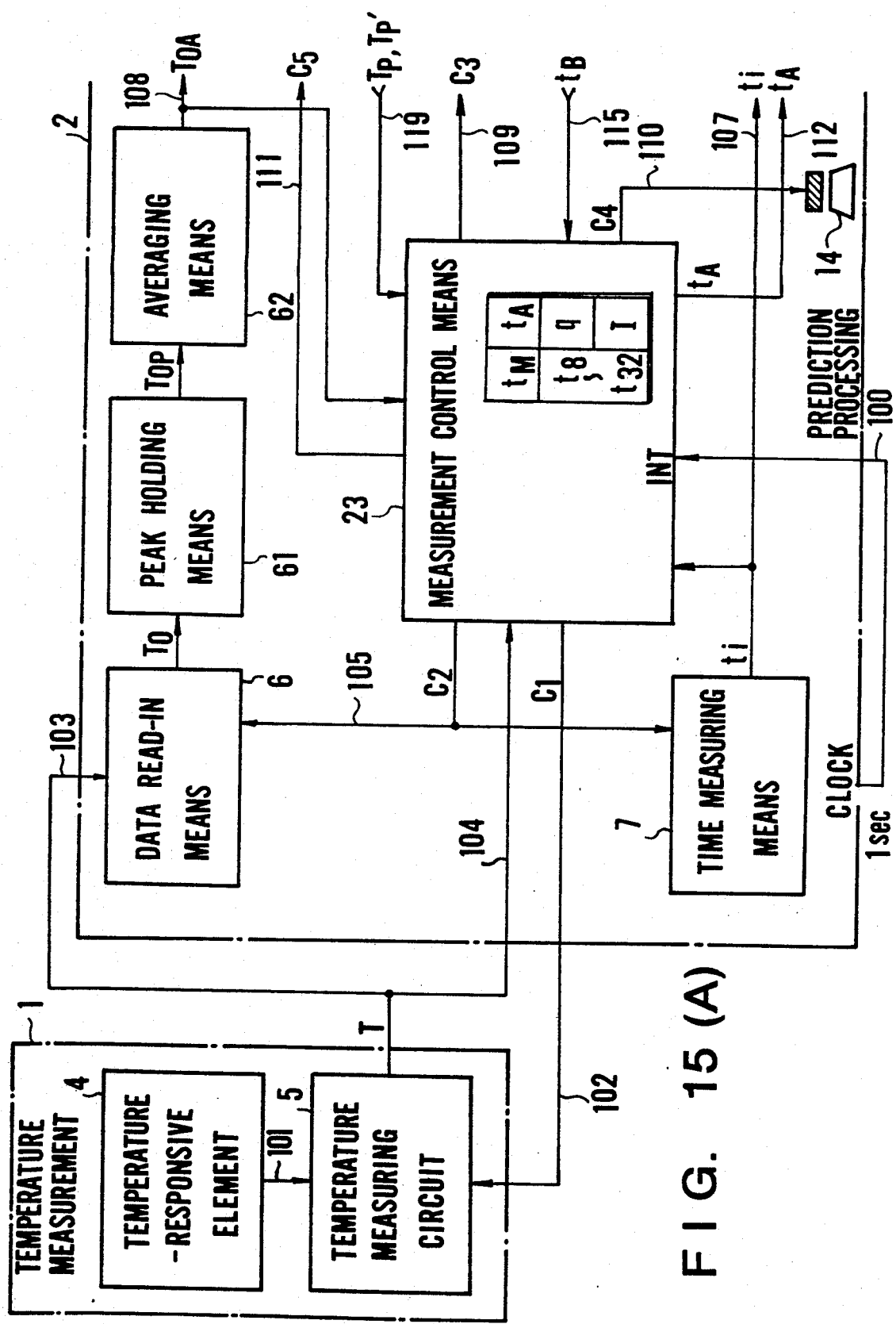
F I G. 15 (A)

METHOD AND APPARATUS FOR MEASURING TEMPERATURE OF A LIVING BODY

FIELD OF THE INVENTION

This invention relates to a method and apparatus for measuring the temperature of a living body, and more particularly, to such method and apparatus capable of predicting what a sensed temperature will be at a future time.

BACKGROUND OF THE INVENTION

In a conventional apparatus, often referred to as an electronic clinical thermometer, for measuring the temperature of a living body, the apparatus is programmed to incorporate a prediction formula set up to perfectly define temperature rise curves, and a so-called "add-on value" determined by the prediction formula is added to an actually sensed temperature to obtain an early display of what the equilibrium temperature should eventually be. To this end, it is required that constants (parameters) used in the prediction formula be set to values which will statistically minimize a prediction error. This is done in the manufacturing process of each electronic clinical thermometer by applying statistical processing to actual measurement values obtained from a temperature probe used in actually measuring temperature.

It is known that temperature rise curves differ from one individual to another, and that a temperature rise curve when temperature is sensed in an armpit will differ considerably from that when temperature is sensed orally even for one and the same individual. As a result, an early display of an accurately predicted equilibrium temperature cannot be obtained in actual practice even if the prediction formula is corrected for dispersion exhibited by the thermal characteristics of the probe.

An electronic clinical thermometer disclosed in the specification of Japanese Patent Application Laid-Open (KOKAI) No. 58-225326 solves the above problem by incorporating a plurality of prediction formulae. More specifically, the thermometer is provided beforehand with a plurality of prediction formulae stipulated by statistical processing based on a large quantity of measurement results. When temperature is actually measured, condition settings are altered on a trial-and-error basis, as by comparing the rise curve of the temperature being measured and a selected one of the prediction formulae. In other words, the parameters in the selected prediction formula are modified by trial and error to solve the aforementioned problem encountered in the prior art. However, since the plural prediction formulae must be defined in advance, a practical problem that cannot be avoided is the trouble involved in adjusting for dispersion in the thermal characteristics of the temperature probes when these are mass-produced. Furthermore, in order to raise the accuracy of prediction, a large number of prediction formulae having different rise curves must be incorporated in the thermometer in advance. If an improper prediction formula is selected just as temperature is starting to rise, moreover, the transition exhibited by the predicted value may overshoot.

An electronic clinical thermometer disclosed in the specification of Japanese Patent Application Laid-Open (KOKAI) No. 59-187233 solves this problem by setting up a prediction formula which conforms to the rise curve of the actually measured temperature. In other words, use is made of the fact that a linear relationship ($TL = A - \tau' t$) exists between a logarithmic value TL of the time differential of measured body temperature and a sampling time t, with A and $\tau'$ being determined by a regression method. However, since the logarithmic value TL is not measured body temperature per se, an error due to differential and logarithmic calculations is introduced into the temperature data, and the error has a major influence on the setting of the constants A and $\tau'$. Moreover, if the measured temperature data include a noise component, the latter affects the predictive results in the manner of an exponential function, causing the predicted values to exhibit a highly unstable transition.

SUMMARY OF THE INVENTION

Accordingly, an object of the present invention is to provide a method and apparatus for measuring the temperature of a living body, in which an accurate early display of temperature is obtained even if temperature rise curves differ due to variability or dispersion in the thermal characteristics of a probe, differences among individuals and differences in the region of the body where temperature is sensed.

Another object of the present invention is to provide a method and apparatus for measuring the temperature of a living body, in which a stable transition in predicted temperature is obtained even if the sensed temperature contains a noise component.

Still another object of the present invention is to provide a method and apparatus for measuring the temperature of a living body, in which sensed temperature which will prevail at any future time is predicted easily and accurately.

Yet another object of the present invention is to provide a method and apparatus for measuring the temperature of a living body, in which an equilibrium temperature value which will prevail in the future upon elapse of an extended period of time is accurately predicted.

A further object of the present invention is to provide a method and apparatus for measuring the temperature of a living body, in which the reliability of a predicted temperature is greatly enhanced by mitigating the influence of a fluctuation in temperature change as caused by movement of the living body undergoing temperature measurement.

A further object of the present invention is to provide a method and apparatus for measuring the temperature of a living body, in which the reliability of a predicted temperature is greatly enhanced by limiting the specific part of the living body where temperature is sensed, e.g. by limiting the part to the armpit, mouth or rectum.

A further object of the present invention is to provide a method and apparatus for measuring the temperature of a living body, in which a valid prediction display is obtained at a comparatively early stage by accurately recognizing the shape of a sensed temperature curve, or the shape of the sensed temperature rise, at an early stage.

A further object of the present invention is to provide a method and apparatus for measuring the temperature of a living body, in which the abovementioned objects are attained through a simple construction and simple data processing without requiring the storage or simultaneous processing of a large quantity of temperature data.

According to the present invention, the foregoing objects are attained by providing a method of measuring the temperature of a living body comprising a step of providing a predetermined predictive functional formula in which the value of a shape parameter for reflecting the shape of a sensed temperature curve and the value of coefficient parameters for superimposing said prediction function on said sensed temperature curve are unknown, a temperature sensing step of sensing temperature and generating temperature data indicative of the temperature sensed, a time measurement step of measuring elapsed time from start of temperature measurement and generating time data indicative of the measured elapsed time, a shape parameter setting step of setting the value of shape parameter on the basis of prescribed temperature data obtained in the temperature sensing step, a coefficient parameter setting step of setting the value of coefficient parameters by solving simultaneous equations composed of a plurality of predictive functional formula which includes said set value of shape parameter, and in which temperature data at a plurality of different points in time serve as purposive variables and functions of time data at the plurality of points in time serve as explicative variables, and a prediction processing step of calculating sensed temperature which will prevail at a future time in accordance with the predictive functional formula specified by said set value of shape parameter and coefficient parameters.

In a preferred embodiment, the shape parameter setting step includes setting the value of shape parameter on the basis of predetermined temperature rise slope information, which is based on plural items of temperature data.

In a preferred embodiment, the shape parameter setting step includes setting the value of shape parameter by detecting a point at which the sensed temperature curve exhibits a first predetermined slope, detecting a second slope $S_1$ preceding the detected point and a third slope $S_2$ following the detected point, and comparing the second and third slopes.

In a preferred embodiment, the shape parameter setting step includes setting the value of shape parameter $\alpha$, on the basis of the second slope $S_1$ and third slope $S_2$, in accordance with the following equation:

$$\alpha = Q_1(S_1/S_2) + Q_2(S_1/S_2)^n + Q_3$$

where
 n (a constant) <1
 $Q_1 - Q_3$: constants

In a preferred embodiment, the shape parameter setting step includes setting the value of shape parameter on the basis of plural items of temperature data at an early stage of temperature measurement following the start of measurement.

In a preferred embodiment, the shape parameter setting step includes setting the value of shape parameter $\alpha$, on the basis of information $X_k$ based on plural items of temperature data $T_k$ at respective predetermined points in time, in accordance with the following equation:

$$\alpha = \sum_{k=0}^{4} D_k X_k + D_5$$

where
 where $D_0 - D_5$: constants $X_0 - X_3$: $T_0 - T_3$
$X_4 = (X_3 - X_0)/(X_1 - X_0)$ In a preferred embodiment, the coefficient parameter setting step includes setting the value of coefficient parameters $A_0$, $A_1$ by solving the following simultaneous equations with two unknowns:

$$T(t_1) = A_0 + A_1/t_1^\alpha$$

$$T(t_2) = A_0 + A_1/t_2^\alpha$$

on the basis of temperature data $T(t_1)$, $T(t_2)$ at two different points in time and time data $t_1$, $t_2$ respectively indicative of the points in time at which the temperature is sensed.

In a preferred embodiment, the coefficient parameter setting step includes using, as the temperature data at the two different points in time, temperature data in the vicinity of measurement starting time and temperature data at a present point in time.

In a preferred embodiment, the prediction processing step includes calculating a sensed temperature $T_p(t_D)$, which will prevail at a future time $t_D$, in accordance with the following equation:

$$T_p(t_D) = A_0 + A_1/t_D^\alpha$$

based on a prediction function specified by the value of shape parameter $\alpha$ and coefficient parameters $A_0$, $A_1$.

According to the present invention, the foregoing objects are attained by providing an apparatus for measuring the temperature of a living body comprising memory means for storing a predetermined predictive functional formula in which the value of a shape parameter for reflecting the shape of a sensed temperature curve and the value of coefficient parameters for superimposing said prediction function on said sensed temperature curve are unknown, temperature sensing means for sensing temperature and generating temperature data indicative of the temperature sensed, time measuring means for measuring elapsed time from start of temperature measurement and generating time data indicative of the measured elapsed time, shape parameter setting means for setting the value of shape parameter on the basis of predetermined temperature data outputted by the temperature sensing means, coefficient parameter setting means for setting the value of coefficient parameters by solving simultaneous equations composed of a plurality of predictive functional formula which includes the value of shape parameter set by the shape parameter setting means, and in which temperature data at a plurality of different points in time serve as purposive variables and functions of time data at the plurality of points in time serve as explicative variables, and prediction processing means for calculating sensed temperature which will prevail at a future time in accordance with the predictive functional formula specified by said set value of shape parameter and coefficient parameters.

In a preferred embodiment, the temperature sensing means includes peak holding means for successively detecting peak levels of sensed temperature and for holding and outputting the detected peak levels.

In a preferred embodiment, the temperature sensing means includes peak holding means for successively detecting peak levels of temperature sensed at a predetermined period and for holding and outputting the detected peak levels, and averaging means for obtaining and outputting a running average value of plural peak levels held by the peak holding means.

In a preferred embodiment, the shape parameter setting means sets the value of shape parameter on the basis of predetermined temperature rise slope information, which is based on plural items of temperature data.

In a preferred embodiment, the shape parameter setting means sets the value of shape parameter on the basis of plural items of temperature data at an early stage of temperature measurement following the start of measurement.

In a preferred embodiment, the coefficient parameter setting means sets the value of coefficient parameters $A_0$, $A_1$ by solving the following simultaneous equations with two unknowns:

$$T(t_1) = A_0 + A_1/t_1^\alpha$$

$$T(t_2) = A_0 + A_1/t_2^\alpha$$

on the basis of temperature data $T(t_1)$, $T(t_2)$ at two different points in time and time data $t_1$, $t_2$ respectively indicative of the points in time at which temperature is sensed.

In a preferred embodiment, the coefficient parameter setting means includes using, as the temperature data at the two different points in time, temperature data in the vicinity of measurement starting time and temperature data at a present point in time.

In a preferred embodiment, the prediction processing means calculates a sensed temperature $T_p(t_D)$, which will prevail at a future time $t_D$, in accordance with the following equation:

$$T_p(t_D) = A_0 + A_1/t_D^\alpha$$

based on a prediction function specified by the set value of shape parameter $\alpha$ and coefficient parameters $A_0$, $A_1$.

BRIEF DESCRIPTION OF THE DRAWINGS

FIG. 1 is a block diagram illustrating the basic construction of an electronic clinical thermometer bodying the present invention;

FIG. 7 is a conceptual view showing a heat conduction model of a body temperature measurement system;

DESCRIPTION OF THE PREFERRED EMBODIMENTS

Preferred embodiments of the invention will now be described in detail with reference to the accompanying drawings.

First Embodiment

Construction

FIg. 1 is a block diagram illustrating the basic construction of an electronic clinical thermometer embodying the present invention. The thermometer basically comprises a temperature measurement section 1, a prediction processing section 2, and a display section 3.

The temperature measurement section 1 senses the temperature at a part of a living body at a predetermined period and outputs temperature data T, which represents the sensed temperature, over a line 103.

The prediction processing section 2 incorporates a predeterminmed predictive functional formula in which the value of a shape parameter for reflecting the shapes of a sensed temperature curve and the value of coefficient parameters for superimposing said prediction function on said sensed temperature curve are unknown. Before measurement starts, the prediction processing section 2 monitors the sensed temperature data T from the measurement section 1 to determine whether predetermined conditions for starting measurement have been satisfied. Once measurement has started, the section 2 monitors both the sensed temperature data T from the measurement section 1 and time data t from an internal function which keeps track of elapsed measurement time. The processing section 2 is further adapted to detect a point at which the detected temperature data T indicate a first predetermined slope, detect second and third slopes preceding and following the detected point, respectively, and compare the second and third slopes, thereby setting the value of the shape parameter of the prediction function. The processing section 2 then proceeds to solve two simultaneous equations, with too unknowns, of the prediction function. In the simultaneous equations, which include the set value of shape parameter, sensed temperature data at two points serve as purposive variables and functions of time data at the two points in time serve as explicative variables. Solving the two simultaneous equations sets the value of coefficient variables of the prediction function. Next, the processing section 2 calculates sensed temperature which will prevail at a future time $t_D$ in accordance with the prediction function specified by the set value of shape parameter and coefficient parameters. The processing section 2 outputs the results of the calculation, namely a predicted temperature $T_p(t_d)$, over a line 121.

The display section 3 numerically displays the predicted temperature $T_p(t_D)$, which is calculated successively with the passage of time.

Figure 2A:
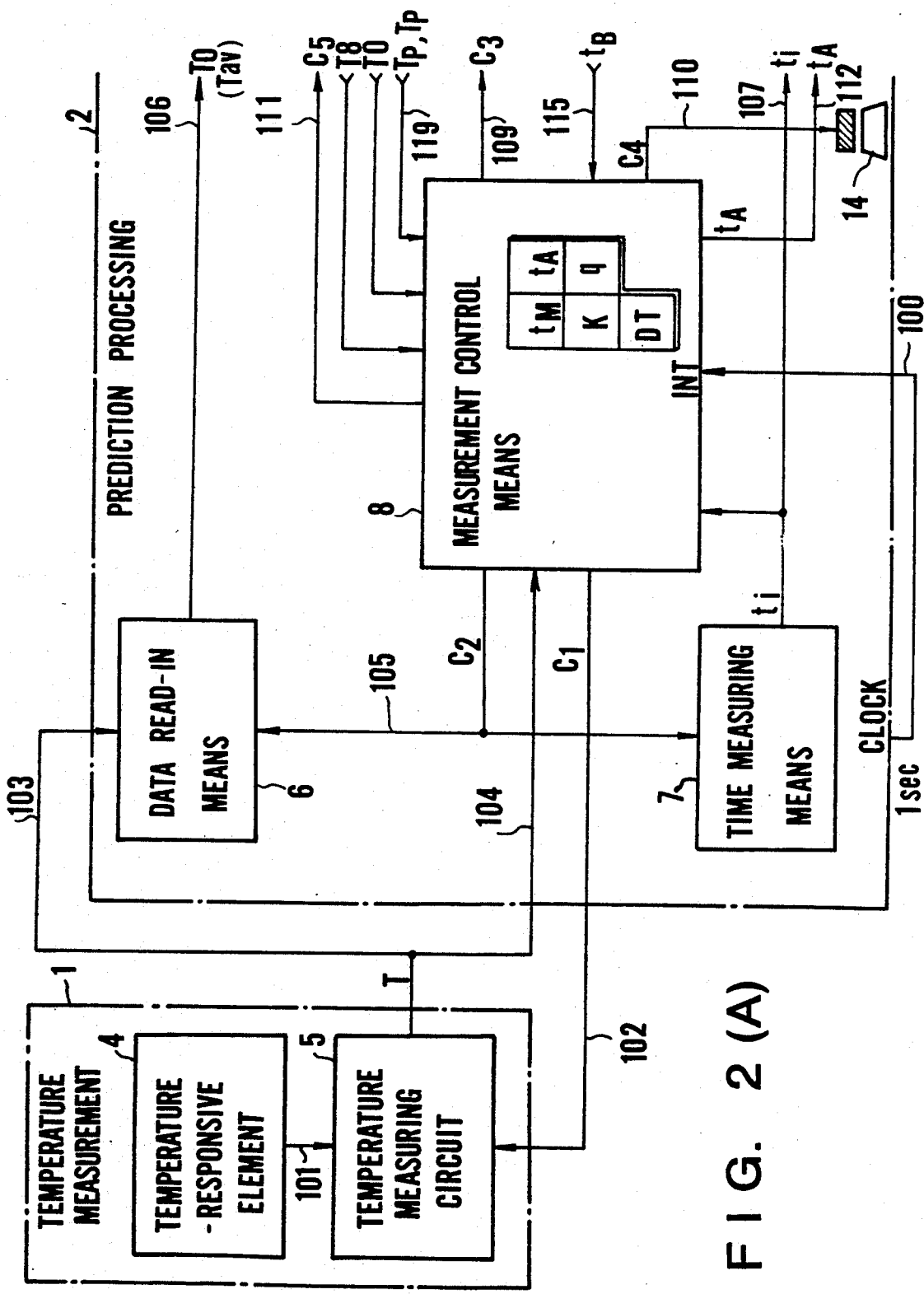
FIGS. 2(A) and 2(B) are block diagrams illustrating the specific construction of a first embodiment of the electronic clinical thermometer according to the invention.
Figure 2B:
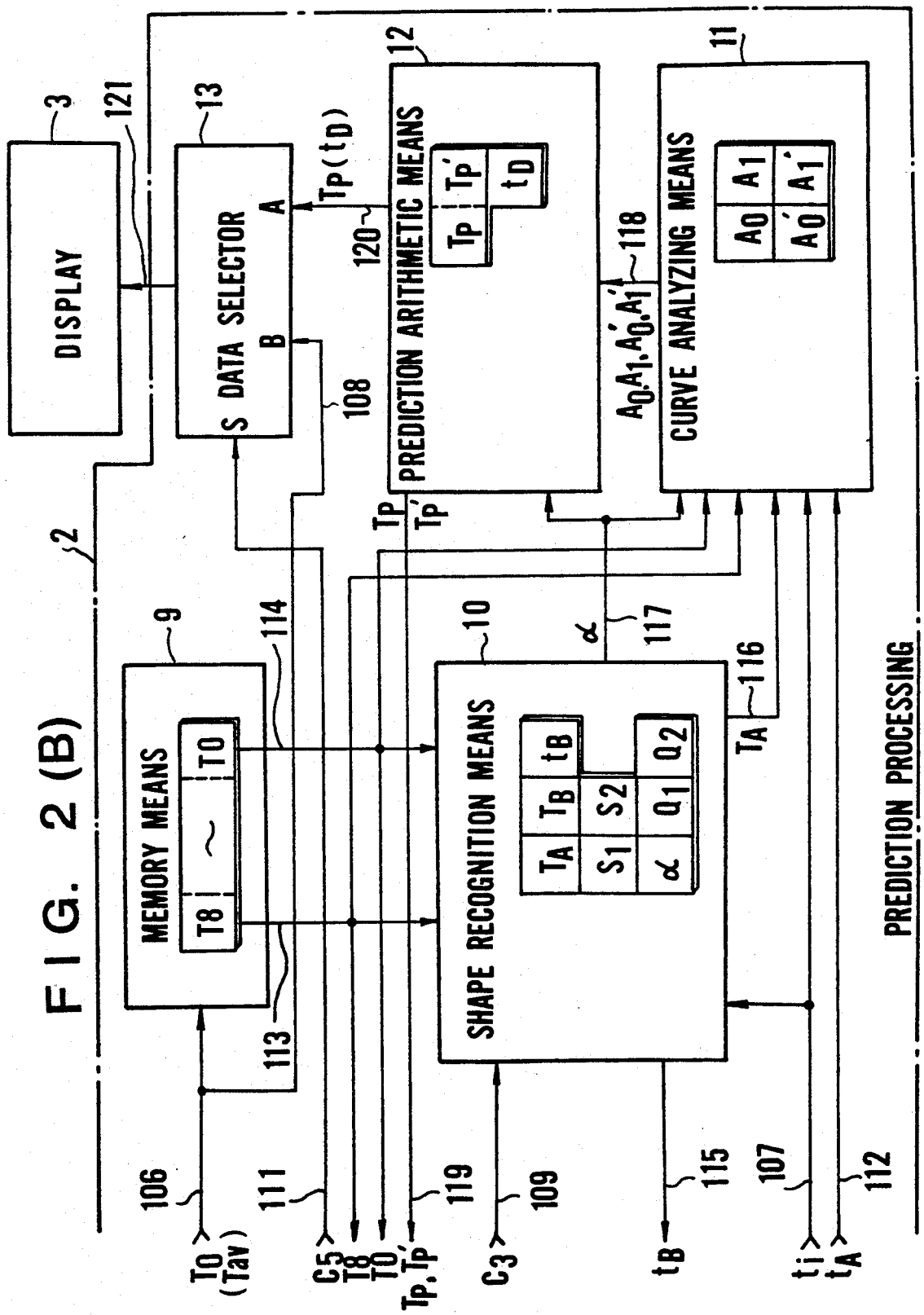

FIGS. 2(A) and 2(B) are block diagrams showing the construction of the electronic clinical thermometer of the first embodiment in greater detail.

As shown in FIGS. 2(A) and 2(B), the temperature measurement section 1 includes a temperature-responsive element 4 such as a thermister, and a temperature measuring circuit 5. In accordance with a data sampling signal $C_1$ having a predetermined period received from the prediction processing section 2 via a line 102, the temperature measurement circuit 5 samples an analog voltage signal 101, which conforms to the temperature sensed by the element 4, and converts the signal into digital temperature data T outputted on lines 103, 104.

The prediction processing section 2 includes data read-in means 6, time measuring means 7, measurement control means 8, memory means 9 for storing temperature data, shape recognition means 10 for recognizing the shape of a sensed temperature curve, curve analyzing means 11 for analyzing the sensed temperature curve, prediction arithmetic means 12, and a data selector 13. It should be noted that the functional blocks 6 through 13 shown in FIGS. 2(A) and 2(B) can be implemented by having a microcomputer (CPU) execute the programs shown in FIGS. 3(A) through 3(E) and FIGS. 4(A) through 4(C), which are stored in a memory (ROM or RAM), not shown. The arithmetic processing section 2 is also provided with a buzzer 14, which emits a sound to inform the user of the fact that a valid temperature prediction has been made.

The measurement control means 8 controls the overall operation of the electronic clinical thermometer. Prior to the start of temperature measurement, the control means 8 causes the temperature measuring circuit 5 to generate the temperature data T at a rate of e.g. once per five seconds to save power, monitors the temperature data constantly via line 104, and determines whether predetermined measurement starting conditions have been satisfied. For example, this means determining whether the data T represent a temperature higher than a certain temperature value, and whether the amount of temperature change is greater than a certain value. When these conditions are satisfied, the control means 8 outputs a control signal $C_2$ over a line 105 to activate such functional blocks as the data read-in means 6, time measuring means 7 and memory means 9, whereby measurement is started. After measurement starts, the control means 8 receives, via a line 100, a clock signal CLOCK having a period of e.g. 1 sec generated by a CPU. The various blocks operate, in a manner described later, in accordance with timer interrupt processing, described below, provided so as to respond to the clock signal.

The measurement control means 8 is provided with a group of registers storing decision constants necessary for measurement control to proceed. The registers include a register $t_M$ for storing a value (e.g. 600 sec) of elapsed measurement time, beyond which it would be meaningless to continue predictive calculations when actually measuring body temperature; a register $t_A$ for storing a time (e.g. 1 sec), in the vicinity of a measurement starting point, as a time for sampling one item of temperature data necessary for setting the parameters of the prediction function; a register k storing an amount of temperature increase (e.g. 0.15° C. in 8 sec) for detecting the aforementioned point at which the sensed temperature curve indicates the first predetermined slope; a register q storing an allowable value (e.g. 0.02° C.), which is used in deeming that a prediction is valid, regarding the absolute value of a difference between predicted temperatures calculated at a predetermined time interval (e.g. 8 sec); and a register DT for storing time period information (e.g. 16 sec) representing time from the point at which the first predetermined slope is detected to the point at which the third slope is detected.

The sensed temperature data T are outputted on line 103 at the same time that the measurement control means 8 outputs the sampling signal $C_1$ having the period of one second via line 102. The data read-in means 6 reads the sensed temperature data T into the prediction processing section 2, and is capable of storing plural item of successive temperature data T while updating the same in FIFO (first-in first-out) fashion. The data read-in means 6 has an output terminal from which it is possible to obtain a running average value $T_{av}$ of the plural items of sensed temperature data. If such an arrangement is adopted, the items of temperature data T can be averaged so that the predicted temperature will exhibit a stabler transition.

The time measuring means 7 clocks elapsed time from the start of temperature measurement and outputs, via line 107, elapsed time date $t_i$ representing the elapsed time. After temperature measurement starts, the time measuring means 7 counts up the 1 sec signal outputted by the measurement control means via line 105, thereby keeping track of elapsed time from the start of temperature measurement.

The memory means 9 constantly stores nine items of sensed temperature data, including the most recent, while successively performing a shift-in/shift-out of the sensed temperature data $T_O$, read in by the read-in means 6, from a register T8 to a register $T_O$ of the memory means.

The shape recognition means 10 is adapted to grasp, through a simple and effective method, the shape of the rising part of the sensed temperature curve observed at an early stage of body temperature measurement, and the purpose thereof is to set the value of the prediction function shape parameter $\alpha$ early in the temperature measurement process.

The concept of the shape parameter setting procedure will now be described with reference to FIG. 6.

Figure 6:
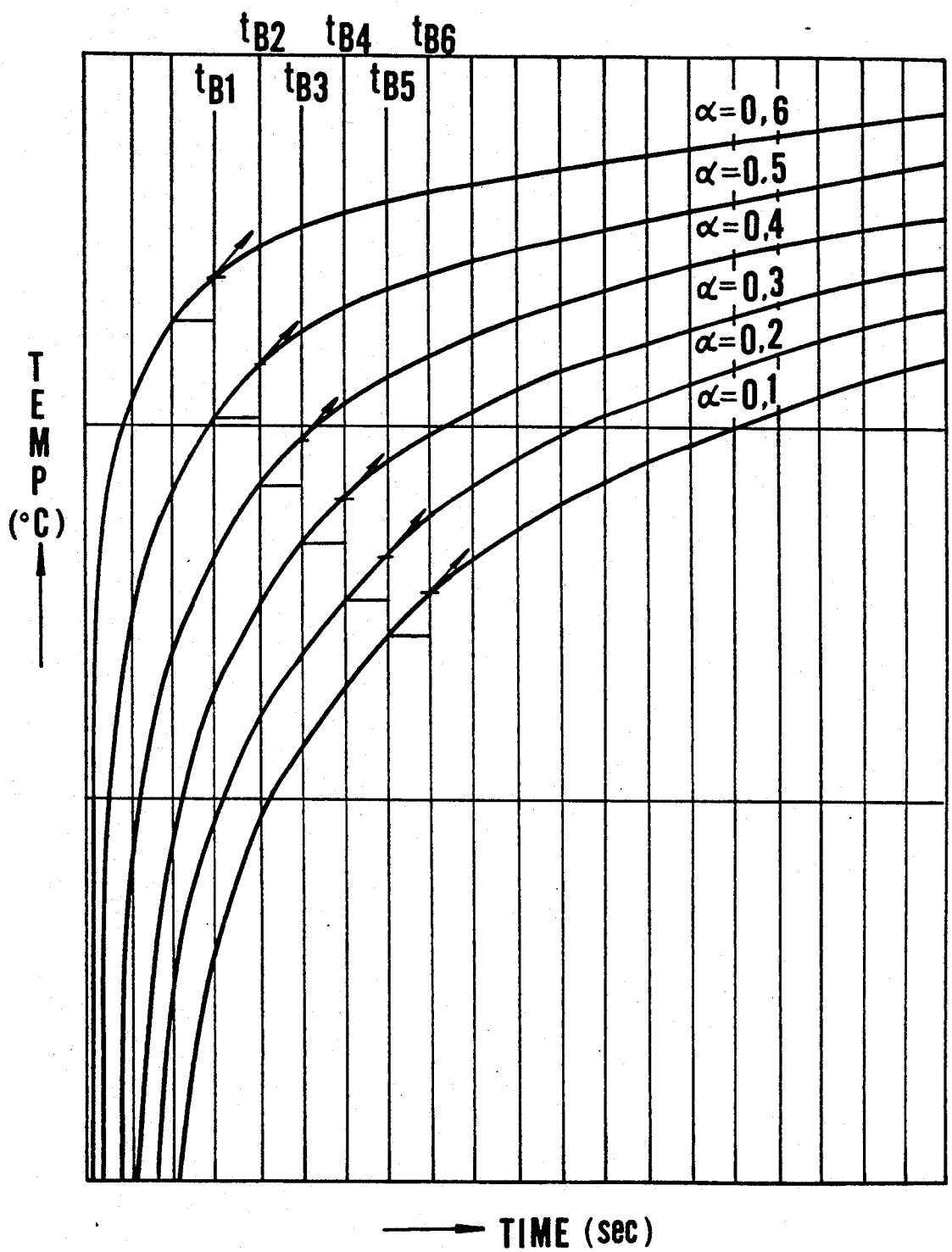
FIG. 6 is a graph showing a plurality of typical temperature rise curves selected by actual measurement and statistical processing.

FIG. 6 is a graph showing a plurality of typical temperature rise curves selected by actual measurement and statistical processing. Elapsed measurement time t (sec) is plotted along the horizontal axis, and the sensed temperature data T (° C) are plotted along the vertical axis. As is apparent from the graph, the temperature rise curves all exhibit a fairly steep rising characteristic in the vicinity of measurement starting time, then a first slope (from time $tB_1$ to time $tB_6$ in the graph), and then a gently rising characteristic.

The shape of such temperature rise curves can be expressed by an element ($1/.t_i{}^\alpha$ in the second term on the right-hand side of the following prediction formula in accordance with the invention:

$$T_O(t_i) = A_0 + A_1/t_i{}^\alpha$$

In other words, if the value of shape parameter $\alpha$ is suitably selected, the shape of any one of the temperature rise curves in FIG. 6 can be expressed. Values of the shape parameter $\alpha$ corresponding to the temperature rise curve shapes are shown in FIG. 6 and serve as illustrative examples. It will be understood from the graph that the larger the value of $\alpha$ in the vicinity of measurement start, the steeper the rising characteristic will be, and that the smaller the value of $\alpha$, the gentler the rising characteristic will be. However, a sharp distinction cannot be drawn among a plurality of temperature rise curves based solely on whether the rising characteristic near the beginning of measurement is steep or gentle.

Accordingly, the shape recognition means 10 is adapted to detect the point (the shoulder portion in FIG. 6) at which the temperature rise curve exhibits the first predetermined slope, a second slope of a relatively steeper portion of the curve preceding the abovementioned point, and a third slope of a relatively gentler portion of the curve following the abovementioned point, and to compare the second and third slopes to distinguish among the plurality of temperature rise curves. For a temperature rise curve associated with the parameter $\alpha=0.6$, by way of example, the comparison will show that the second slope is very steep and the third slope very gentle. For a temperature rise curve associated with the parameter $\alpha=0.1$, on the other hand, the comparison will show that the second slope is relatively gentle as well as the third slope. Accordingly, if the second and third slopes flanking the shoulder portion are examined, more useful information for distinguishing among the plurality of temperature rise curves can be obtained. Thus, it can be expected that employing the ratio of the two slopes (second slope/third slope) will greatly clarify the differences among the curve shapes, and that the value of the ratio will be proportional to the value of the shape parameter $\alpha$.

The shape recognition means 10 can be adapted to set the value of shape parameter $\alpha$ by using another method simpler than that described above. For example, it is possible to express the value of shape parameter $\alpha$ by the slope of a temperature curve at a predetermined times or by plural items of temperature data at predetermined times following the start of measurement. More specifically, the shape recognition means 10 can be adapted to set the value of the shape parameter $\alpha$ in accordance with a variable or set of variables having a high correlation with respect to the value of the shape parameter $\alpha$.

Thus, in accordance with the concept described above, the shape recognition means 10 in the present embodiment sets the value of the shape parameter $\alpha$ based on the sensed temperature at an early stage of body temperature measurement.

The shape recognition means 10 includes a group of registers for storing information necessary to set the value of shape parameter $\alpha$. These registers include a register $T_A$ for storing temperature data $T_A$ sensed at a comparatively early time $t_A$ after the start of temperature measurement (e.g. a point in time 1 sec after the start of measurement); a register $T_B$ for storing sensed temperature data $T_B$ which prevails at a point in time where the measurement control means 8 detects the first slope (shoulder); a register $t_B$ for storing time $t_B$ which has elapsed up to said point in time; a register $S_1$ for storing a sensed temperature difference value $S_1 = T_B - T_A$; a register $S_2$ for storing a sensed temperature difference value $S_2 = T8 - T_B$, where T8 is the temperature data prevailing a predetermined time DT (e.g. 16 sec) after detection of the shoulder; a register $\alpha$ for storing the shape parameter, which is obtained by performing a calculation expressed by the equation $\alpha = (S_1/S_2) \times Q_1 + Q_2$; a register $Q_1$ for storing the constant $Q_1$ (e.g. 0.042); and a register $Q_2$ for storing the constant $Q_2$ (e.g. $-0.128$).

The curve analyzing means 11 employs a prediction function, which includes the value of shape parameter $\alpha$ set by the shape recognition means, to set the value of coefficient parameters $A_0$, $A_1$ of the prediction function. Specifically, the curve analyzing means 11 obtains the value of coefficient parameters $A_0$, $A_1$ by solving the following simultaneous equations:

$$T_O(t_1) = A_0 + A_1/t_1{}^\alpha$$

$$T_O(t_2) = A_0 + A_1/t_2{}^\alpha$$

on the basis of temperature data $T_O(t_1)$ in the vicinity of the measurement starting point, temperature data $T_O(t_2)$ at a present point in time, and time data $t_1$, $t_2$ indicative of the corresponding points in time at which the temperatures were sensed. The value of coefficient parameters $A_0$, $A_1$ thus set, along with the already set the value of shape parameter $\alpha$, uniquely specify the aforementioned prediction formula.

In order to examine the validity of the specified prediction formula at all times, the curve analyzing means 11 also sets the value of coefficient parameters $A_0'$, $A_1'$, which prevailed e.g. eight seconds earlier, by using sensed temperature data which prevailed eight seconds prior to the present as the present temperature data $T_O(t_2)$. To this end, the curve analyzing means 11 is provided with registers $A_0$, $A_1$ for storing the value of coefficient parameters $A_0$, $A_1$, which are obtained by using the presently prevailing sensed temperature data T8 as the presently prevailing sensed data $T_O(t_2)$, and registers $A_0'$, $A_1'$ for storing the value of coefficient parameters $A_0'$, $A_1'$, which are obtained by using the sensed temperature data T0 that prevailed eight seconds prior to the present as the presently prevailing sensed data $T_O(t_2)$.

The prediction arithmetic means 12 uses the presently prevailing prediction equation specified by the curve analyzing means 11 to calculate a sensed temperature value which will prevail in the future, preferably at any desired future time. More specifically, in accordance with the prediction function specified by the set value of shape parameter $\alpha$ and coefficient parameters $A_0$, $A_1$, a predicted value $T_p(t_D)$ of sensed temperature which will prevail at a future time $t_D$ is calculated by using the following equation:

$$T_p(t_D) = A_0 + A_1/t_D^\alpha$$

This item of predicted temperature data $T_p(t_D)$ is outputted over a line 120.

Further, in accordance with the prediction function specified by the value of coefficient parameters $A_0'$, $A_1'$ prevailing eight seconds earlier, the prediction arithmetic means 12 similarly calculates a predicted value $T_p(t_D)'$ of sensed temperature which will prevail at future time $t_D$ by using the following equation:

$$T_p(t_D)' = A_0' + A_1'/t_D^\alpha$$

This item of predicted temperature data $T_p(t_D)'$ is outputted together with the aforementioned predicted temperature data $T_p(t_D)$ to the measurement control means 8 via a line 119. The measurement control means 8 compares the items of predicted temperature data $T_p(t_D)$, $T_p(t_D)'$ to judge the validity (consistency) of the predicted value.

The predictive arithmetic means 12 is provided with a group of registers for storing information needed to supply a predicted temperature. These registers include a register $T_p$ for storing temperature $T_p$ predicted from the present time onward, a register for storing temperature $T_p'$ from eight seconds earlier, and a register $t_D$ for storing future time $t_D$ (e.g. the time which will prevail upon elapse of ten minutes).

Upon passage of a period of time so long that continuing predictive calculations will be meaningless in an actual body temperature measurement, the data selector 13, which comprises switching means, terminates the early display based on the predicted temperature $T_p(t_D)$ and instead switches over to a direct display based on the temperature data $T_O$. Since the data selector 13 is connected to the prediction arithmetic means 12 until it is judged that predetermined prediction terminating conditions are satisfied after the start of measurement, the display section 3 displays the predicted temperature $T_p(t_D)$.

Prediction Principle

The principle of operation for predicting temperature in accordance with the invention will now be described.

By performing a theoretical analysis of heat conduction in a body temperature measurement system, the inventor has estimated the shape of a temperature rise curve of a temperature probe when body temperature is measured. Specifically, the analytical method entails using a model of a body temperature measurement system of the type shown in FIG. 7, by way of example, dividing the measurement system into three regions, namely a probe region, skin region and subcutaneous tissue region, and assuming that the temperature distribution of each region is uniform in the body temperature measurement process. In other words, each region is treated conceptually as being of an infinitesimal volume. With regard to the subcutaneous tissue region, however, the thermal capacity is assumed to be infinity. It should be noted that the terms "skin" and "subcutaneous tissue" are used for the sake of convenience since the living body is assumed to be a two-layer model; these do not strictly correspond to the actual structure of a living body. Furthermore, by dividing the system into a greater number of parts in accordance with future developments, it will be possible to improve the model to more closely resemble a living body if this is necessary.

In the measurement system model of FIG. 7, let $h_1$ represent the thermal conductivity between the probe and skin, $A_1$ the area of the interface, $h_2$ the thermal conductivity between the skin and subcutaneous tissue, and $A_2$ the area of the interface. Further, on the assumption that the thermal capacity of the subcutaneous tissue is infinity, the temperature of the subcutaneous tissue will be a constant value $T_{sat}$ with respect to time. Thus, the amount of heat absorbed by the probe from the skin after the probe is brought into contact with a part of the living body at which temperature is to be measured is equal to an amount of increase in the internal energy of the probe. Therefore, the following equation holds:

$$h_1 A_1 (T_s - T_p) = \rho_p C_p V_p \frac{dT_p}{dt} \qquad (1)$$

Similarly, the amount of heat absorbed by the skin from the subcutaneous tissue and the probe is equal to an amount of increase in the internal energy of the skin. Therefore, the following equation holds:

$$h_1 A_1 (T_p - T_s) + h_2 A_2 (T_{sat} - T_s) = \rho_s C_s V_s \frac{dT_s}{dt} \qquad (2)$$

where $T_p$, $\rho_p$, $C_p$, $V_p$: temperature, density, specific heat and volume of probe $T_s$, $\rho_s$, $C_s$, $V_s$: temperature, density, specific heat and volume of skin $T_{sat}\{=T_p(\infty)\}$: subcutaneous tissue temperature = equilibrium temperature If the simultaneous linear differential equations comprising Eqs. (1) and (2) are solved, then the following equation is obtained:

$$\frac{d^2 T_p}{dt^2} + (K_1 - K_2 + K_3) \frac{dT_p}{dt} + K_1 K_3 T_p = K_1 K_3 T_{sat} \qquad (3)$$

where $$K_1 = \frac{h_1 A_1}{\rho_p C_p V_p}$$

$$K_2 = \frac{h_1 A_1}{\rho_s C_s V_s}$$

$$K_3 = \frac{h_2 A_2}{\rho_s C_s V_s}$$

Since Eq. (3) is a higher order linear differential equation, it can be solved using a Laplace transformation. That is, using $$\pounds \frac{d^2 T_p}{dt^2} + (K_1 - K_2 + K_3) \pounds \frac{dT_p}{dt} +$$

-continued
$$K_1 K_3 \, \pounds \, T_p = K_1 K_3 \, \pounds \, T_{sat}$$

and calculating each term, we have $$\pounds \, \frac{d^2 T_p}{dt^2} = -C_1 - C_o s + s^2 \, \pounds \, T_p$$

$$\pounds \, \frac{dT_p}{dt} = -C_o + s \, \pounds \, T_p$$

where $$C_o = T_p(0) \quad C_1 = \left. \frac{dT_p}{dt} \right|_{t=0}$$

Solving the above for $\pounds T_p$, we obtain $$\pounds \, T_p = \frac{1}{s^2 + (K_1 - K_2 + K_3)s + K_1 K_3} \times \quad (4)$$

$$\left\{ C_1 + (K_1 - K_2 + K_3) C_o + sC_o + \frac{K_1 K_3}{s} T_{sat} \right\}$$

Using the solution $s^2 + (K_1 - K_2 + K_3)s + K_1 K_3 = 0$ for $m_1, m_2$, we have $$m_1 = \tfrac{1}{2}\{-(K_1 - K_2 + K_3) + \sqrt{(K_1 - K_2 + K_3)^2 - 4K_1 K_3}\}$$

$$m_2 = \tfrac{1}{2}\{-(K_1 - K_2 + K_3) - \sqrt{(K_1 - K_2 + K_3)^2 - 4K_1 K_3}\}$$

When $m_1 \neq m_2$ holds, we have the following from Eq. (4):

$$\pounds \, T_p = \frac{1}{s - m_1} \cdot \frac{1}{m_1 - m_2} \times \{C_1 + (K_1 - K_2 + K_3) C_o +$$

$$m_1 C_o + m_2 T_{sat}\} - \frac{1}{s - m_2} \cdot \frac{1}{m_1 - m_2} \times \{C_1 +$$

$$(K_1 - K_2 + K_3) C_o + m_2 C_o + m_1 T_{sat}\} + \frac{T_{sat}}{s}$$

Since it is known that $\pounds e^{kx} = 1/(s-k)$, an equation involving $T_p(t)$ is obtained as follows:

$$T_p(t) = T_{sat} + M_1 e^{m_2 t} + M_2 e^{m_2 t} \quad (5)$$

where $$M_1 = \frac{1}{m_1 - m_2} \{C_1 + (K_1 - K_2 + K_3) C_o + m_1 C_o + m_2 T_{sat}\}$$

$$M_2 = \frac{-1}{m_1 - m_2} \{C_1 + (K_1 - K_2 + K_3) C_o + m_2 C_o + m_1 T_{sat}\}$$

When $m_1 = m_2$ holds, we have the following from Eq. (4):

$$\pounds \, T_p = \frac{1}{(s - m_1)^2} \{C_1 + (K_1 - K_2 + K_3) C_o + m_1 C_o +$$

$$3m_1 T_{sat}\} + \frac{1}{s - m_1} (C_o - T_{sat}) + \frac{T_{sat}}{s} \quad (\because K_1 K_3 = m_1^2)$$

Since it is known that $\pounds e^{kx} = 1/(s-k)$, $\pounds Xe^{kx} = 1/(s-K)^2$, an equation involving $T_p(t)$ is obtained as follows:

$$T_p(t) = T_{sat} + M_3 e^{m_1 t} + M_4 t e^{m_1 t} \quad (6)$$

where
$M_3 = C_0 - T_{sat}$
$M_4 = C_1 - m_1 C_0 + 3 m_1 T_{sat}$

Thus, theoretical equations representing the temperature rise curve of a probe are as given by Eqs. (5) and (6).

In Eqs. (5) and (6), $m_1$, $m_2$ and $M_1$, $M_4$ are given as functions of various physical quantities contained in a body temperature measurement system including physical values (density, specific heat, volume, etc.) of the probe and skin, and these values vary from one thermometer to another and with every temperature measurement. Accordingly, it is required that $m_1$, $m_2$, $M_1$, $M_4$ be set on the basis of the temperature data sensed by the probe when a measurement is taken.

Electronic clinical thermometers include those of the type in which after the probe is brought into contact with the part of the body to be measured, the temperature data do not begin to be read until the probe senses a predetermined temperature, by way of example. For electronic clinical thermometers such as these, it is convenient to transform Eqs. (5) and (6) into the following equations:

$$T_p(t) = T_{sat} + P e^{m_1 t} + Q e^{m_2 t} \quad (7)$$

$$T_p(t) = T_{sat} + R e^{m_1 t} + S t e^{m_1 t} \quad (8)$$

where
$P = M_1 e^{m_1 \cdot \Delta t}$
$Q = M_2 e^{m_2 \cdot \Delta t}$
$R = M_3 e^{m_1 \cdot \Delta t} + M_4 \cdot \Delta t e^{m_1 \cdot \Delta t}$
$S = M_4 e^{m_1 \cdot \Delta t}$ In the above, $\Delta t$ represents elapsed time from the moment the probe is contacted with the body until the start of measurement, and t represents time where measurement starting time is taken as being t=0.

If $m_1$, $m_2$ are taken as being fixed values in Eq. (7), then $T_{sat}$, P, and Q can be obtained with relative ease by regression analysis or by solving the simultaneous equations using temperature data sensed in a time series when a measurement is taken. However, $m_1$, $m_2$ vary with each measurement due differences in the individual undergoing measurement or a difference in measurement conditions. Moreover, the object of the present invention is to find the optimum prediction function by incorporating all of these variable elements every time a measurement is taken, thereby to perform a temperature prediction having a high degree of universality. Though it is mathematically possible to obtain $m_1$, $m_2$, $T_{sat}$, P, and Q by solving the simultaneous equation (7) using temperature data sensed when a measurement is taken, the results would be highly unstable due to the combined effect of (1) the fact that a noise component is contained in the sensed temperature data and (2) the fact that Eq. (7) includes exponential terms.

Accordingly, the following equation is obtained by subjecting Eq. (7) to a Taylor expansion:

$$T_p(t) = A_o + A_1/t + A_2/t^2 + A_3/t^3 + \ldots + A_i/t^i + \ldots \qquad (9)$$
$$= T_{sat} + A_1/t + A_2/t^2 + A_3/t^3 + \ldots + A_i/t^i + \ldots$$
$$\{\because T_p(\infty) = T_{sat}\}$$

Deleting terms of the fourth degree onward gives the following equation:

$$T_p(t) = A_0 + A_1/t + A_2/t^2 + A_3/t^3 \qquad (10)$$

The foregoing will also hold in similar manner for Eq. (8).

The inventor has previously proposed an electronic clinical thermometer in which coefficient parameters $A_0$ through $A_3$ of a prediction function are set by solving the following simultaneous equation with four unknowns:

$$T_O(t_i) = A_0 + A_1/t_i + A_2/t_i + A_2/t_i^2 + A_3/t_i^3 (i=0-3)$$

on the basis of four items of discretely sampled temperature data $T_O(t_i)$ and time data $t_i$ indicative of time at each sampling, using Eq. (10). Since the preceding temperature data include all physical conditions, the coefficient parameters of the prediction function can be set based on a correlation function between these temperature data and time data, and a tentative optimum prediction function can be specified. By using the specified prediction function, the temperature at the future time $t_D$ can be calculated in accordance with the following equation:

$$T_p(t_D) = A_0 + A_1/t_D + A_2/t_D^2 + A_3/t_D^3$$

This method has a high degree of universality and provides a stable prediction. Even though four items of temperature data are used in the above case, however, it is necessary that the four items of data be extracted discretely so as to cover the full scale of the latest sensed temperature curve at all times in order to specify the tentative optimum prediction function every time. To this end, therefore, the old sensed temperature data cannot be discarded, so that a sensed temperature data memory having a very large storage capacity is required. Though the required memory capacity can be reduced somewhat if the number of terms on the right-hand side of Eq. (10) are reduced, diminishing the number of terms excessively results in a prediction function having an excessively gentle or sluggish rise characteristic. This makes it impossible to obtain an effective early display of temperature.

Therefore, in accordance with the invention, the prediction function of Eq. (10) is transformed and the following equation is employed to achieve both a reduction in required memory capacity and a valid early display of temperature:

$$T_p(t) = A_0 + A_1/t^\alpha$$

Operation

FIGS. 3(A)-3(E) and FIGS. 4(A)-4(C) are flowcharts showing temperature sensing processing executed by the electronic clinical thermometer of the first embodiment. FIG. 5 is a timing chart illustrating temperature sensing processing executed by the electronic clinical thermometer of the first embodiment.

Figure 3:
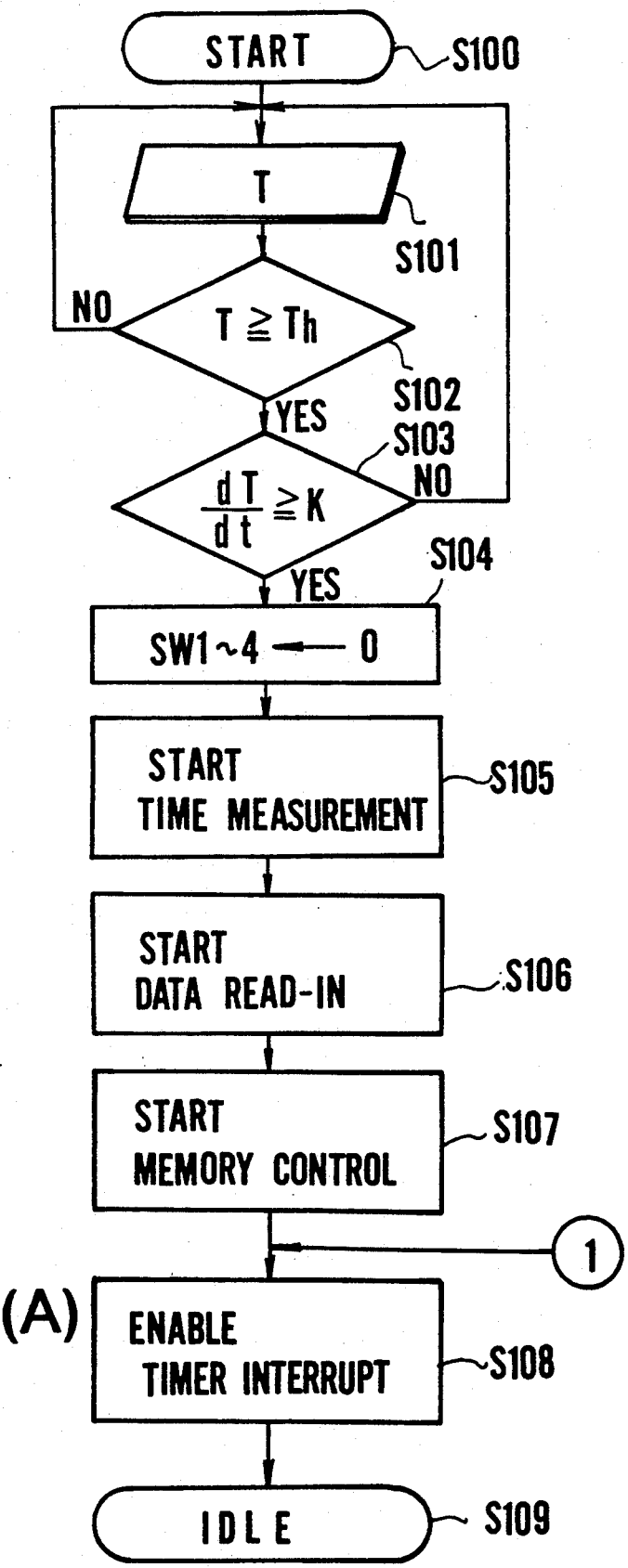
FIGS. 3(A)-3(E) are flowcharts showing temperature sensing processing executed in the first embodiment of the electronic clinical thermometer.

In FIG. 3(A), the first step of the flowchart is a start step S100 at which electric power is supplied to the electronic clinical thermometer. This is followed by a temperature measurement step S101, at which the temperature measurement section 1 and measurement control means 8 are activated to perform a comparatively rough temperature measurement. Specifically, the measurement control means 8 causes the temperature measuring circuit 5 to sense temperature at a rate of e.g. once per five seconds in order to save power, and monitors the sensed temperature data T. Next, steps S102, S103 call for a decision as to whether body temperature measurement based on the prediction method should start. It is determined at the step S102 whether the sensed temperature has exceeded a predetermined temperature $T_h$, e.g. 30° C., and it is determined at the step S103 whether the rate of temperature rise is no less than 0.1° C. per second. In actuality, this step calls for a decision as to whether the thermometer has been placed in an armpit or in the mouth. If the conditions of steps S102, S103 are satisfied, the program proceeds to a step S104, at which various program switches SW1−SW4 for measurement control are cleared. Next, a step S105 calls for the time measuring means to be cleared and started via line 105. In other words, a time measuring counter in the time measuring means 7 is reset (to a count corresponding to the elapsed measurement time t0 in FIG. 5) and clocking of elapsed measurement time is started. The data read-in function of the data read-in means 6 is activated via line 105 at a step S106, and the data storage function of the memory means 9 is activated at a step S107. After execution of these initial setting and control operations, the timer interrupt function for a timer interrupt at a rate of e.g. once per second is activated at a step S108, and the CPU executes an idle routine IDLE at a step S109 to await the occurrence of the timer interrupt.

Figure 3B:
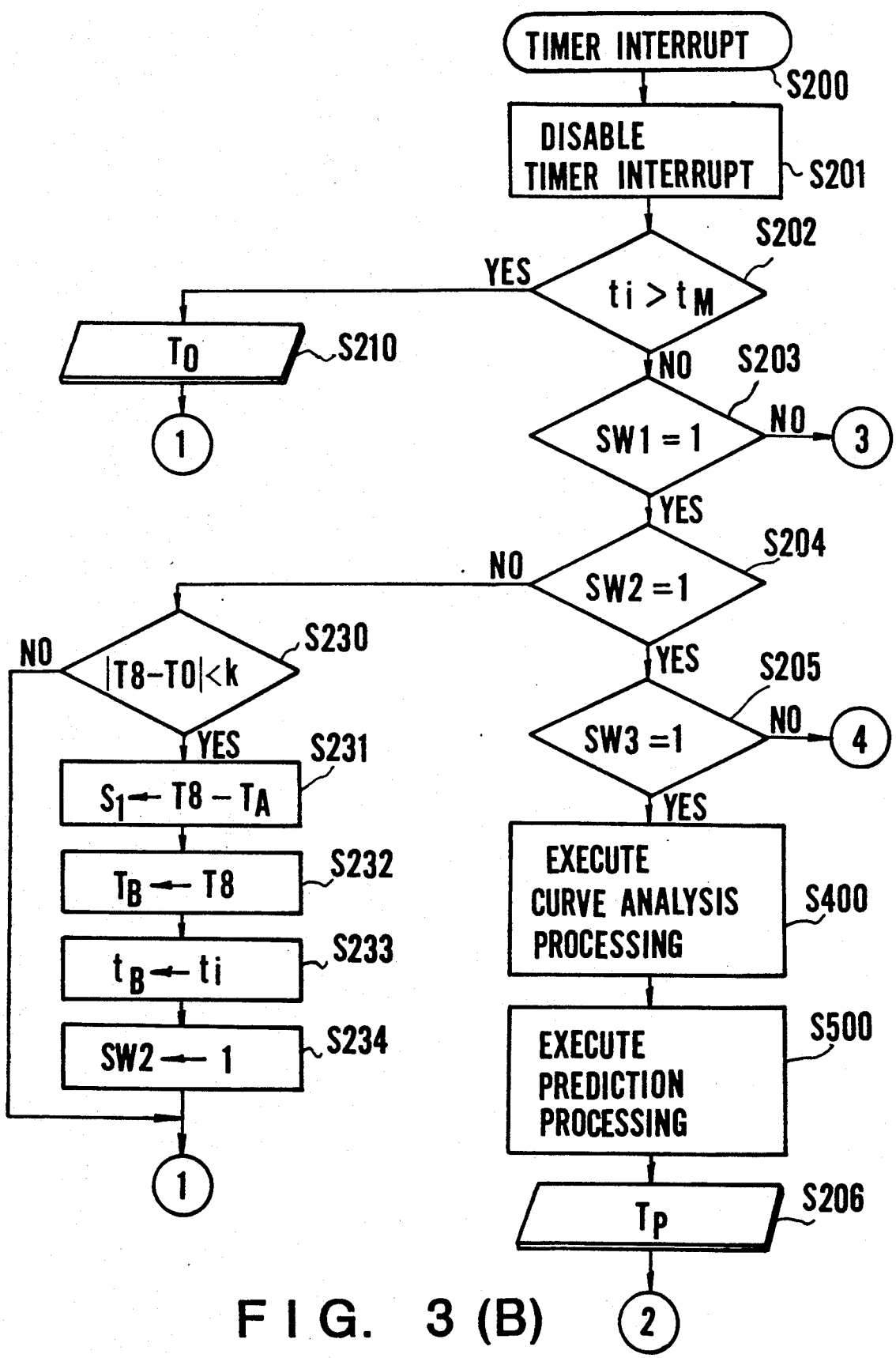
Figure 3:
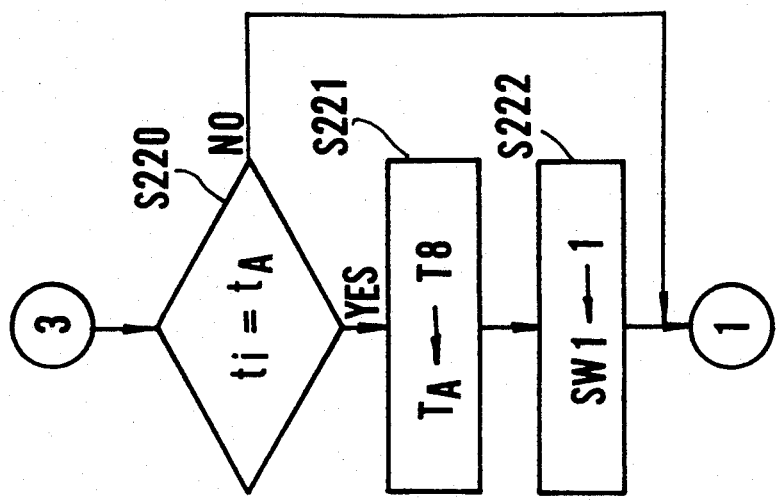
Figure 3:
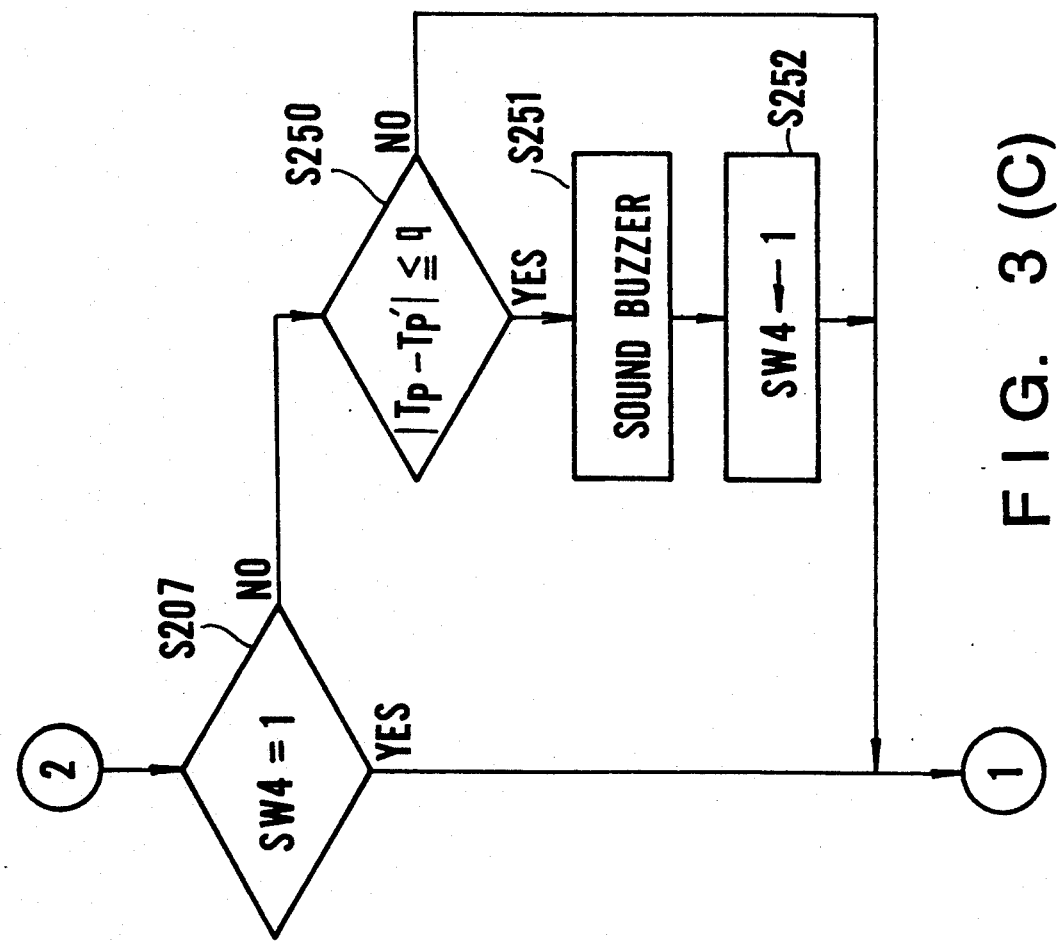

When a timer interrupt is generated at step S109 in FIG. 3(A), the program proceeds to a step S200 in FIG. 3(B). A step S201 in this flowchart disables the timer interrupt function in order that a series of subsequent processing steps may be executed. These steps include a step S202, at which the measurement control means 8 checks whether $t_i > t_M$ (e.g. 600 sec) holds. Since $t_i > t_M$ will not hold at the instant measurement starts, a NO answer is received at step S202 and the program proceeds to a step S203, at which it is checked whether SW1=1 holds. SW1 is a switch for processing in which temperature data sensed in the vicinity of the start of measurement are stored in memory. If SW1=1 does not hold, the program proceeds to a step S220 in FIG. 3(D). Then the relation $t_i = t_A$ is checked at a step S220. The register $t_A$ in the measurement control means 8 stores the elapsed time constant $t_A$ (e.g. 1 sec) indicating elapsed time in the vicinity of the start of measurement. This corresponds to the timing $t_A$ in FIG. 5. If $t_i = t_A$ does not hold, the program returns to the step S108 in FIG. 3(A). However, since the condition $t_i = t_A$ is satisfied in the present embodiment, a YES answer is received at the step S220 and the program proceeds to a step S221, at which the sensed temperature data T8 prevailing at the present time is stored in the register $T_A$, and then to a step S222, at which SW1 is set to logical "1". The switch SW1 remains at logical "1" from this point onward.

When SW1=1 is found to hold at the step S203, the program proceeds to a step S204, at which it is checked whether SW2=1 holds. SW2 is a switch for processing in which the first predetermined slope is detected. If a NO answer is received at the step S204, it is determined at a step S230 whether $\uparrow T8-T0 \uparrow < k$ holds. If this inequality does not hold, this means that the first slope cannot yet be detected, so that the program returns to the step S108 in FIG. 3(A). When $\uparrow T8-T0 \uparrow < k$ is eventually satisfied, however, the program proceeds to a step S231, at which $S_1 = T8 - T_A$ is stored in memory, where $S_1$ is the difference between the two items of sensed temperature data. As shown in FIG. 5, the difference value $S_1 = T8 - T_A$ indirectly represents the second slope. Next, a step S232 calls for the presently prevailing sensed temperature data T8 to be stored in the register $T_B$, the next step S233 calls for the data $t_i$ indicative of elapsed measurement time up to the present to be stored in the register $t_B$, and a step S234 calls for the switch SW2 to be set to logical "1". The switch SW2 remains at logical "1" from this point onward.

When SW2=1 is found to hold at the step S204, the program proceeds to a step S205, at which it is checked whether SW3=1 holds. SW3 is a switch for shape recognition processing applied to the sensed temperature curve, which is done after waiting a predetermined time DT (e.g. 16 sec) following detection of the first slope. When SW3=1 is found not to hold, the program proceeds to a step S240 in FIG. 3(E), at which it is determined whether $t_i = t_B + DT$ holds. If the answer here is NO, then the program returns to the step S108 in FIG. 3(A) until the condition $t_i = t_B + DT$ is satisfied. When this condition is eventually satisfied, shape recognition processing is executed at a step S300. This is time $t_c$ in FIG. 5.

Shape Recognition Processing

Figure 4:
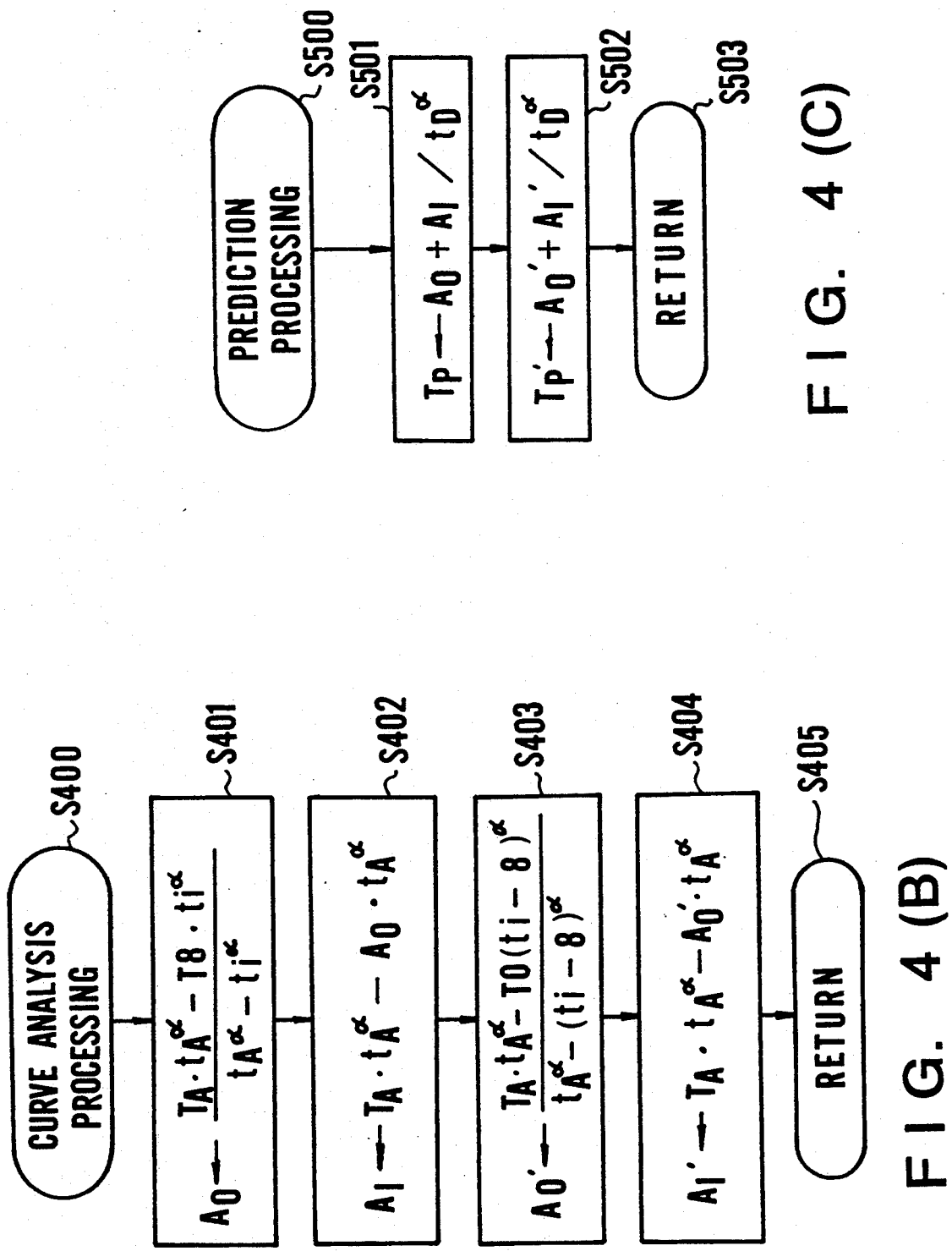
FIG. 4(A) is a flowchart showing shape recognition processing in the first embodiment.
FIG. 4(B) is a flowchart showing curve analysis processing in the first embodiment.
FIG. 4(C) is a flowchart showing prediction processing in the first embodiment.
Figure 5:
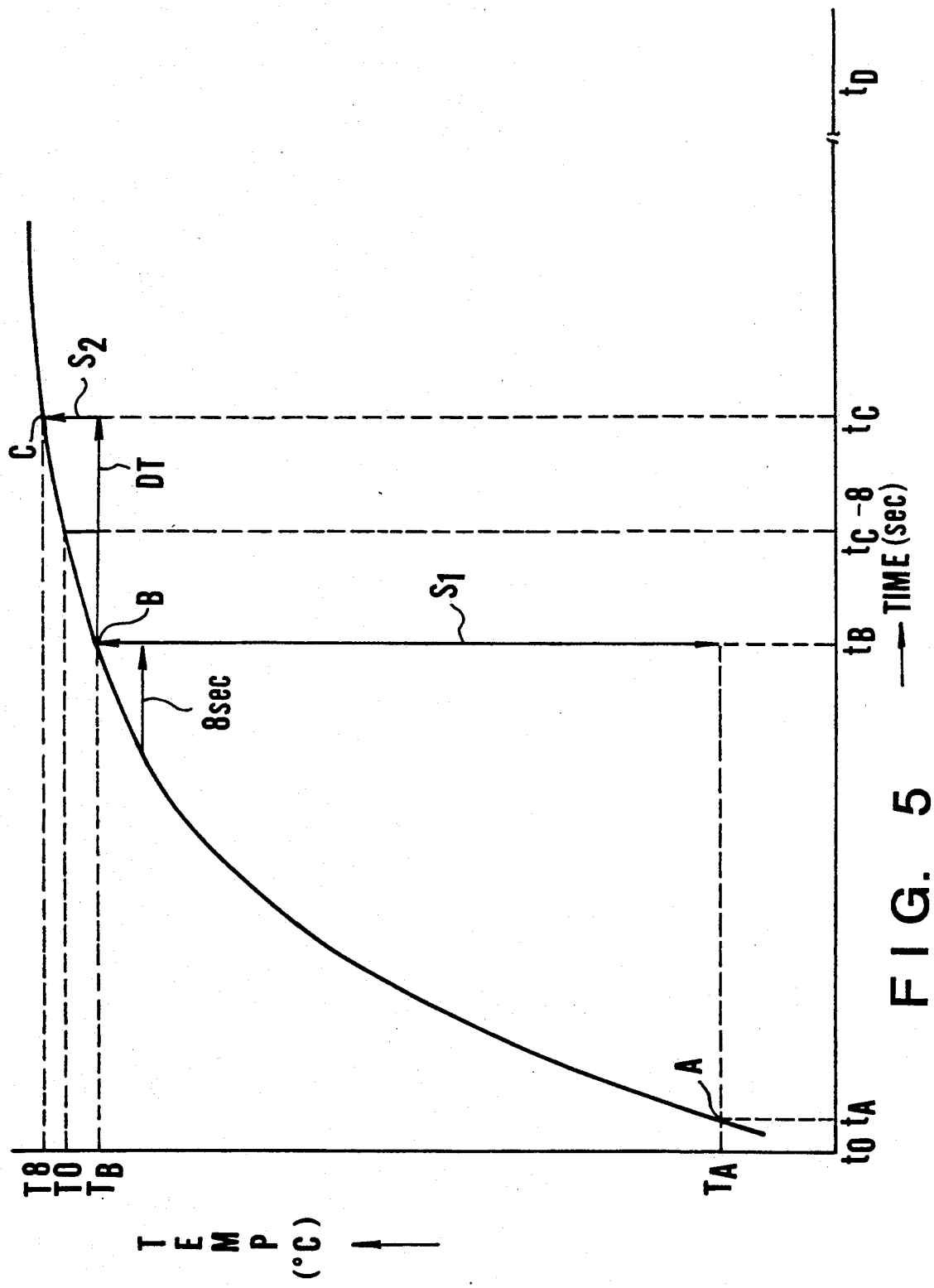
FIG. 5 is a timing chart illustrating temperature sensing processing executed in the first embodiment of the electronic clinical thermometer.

FIG. 4(A) is a flowchart illustrating shape recognition processing in accordance with the first embodiment of the invention. A step S301 calls for a value $T8-T_B$, which is the difference between items of sensed temperature data, to be stored in the register $S_2$. The difference value $T8-T_B$ indirectly represents the third slope in FIG. 5. Next, a step S302 calls for the value of shape parameter $\alpha$ to be obtained in accordance with $$\alpha = \frac{S1}{S2} Q_1 + Q_2$$

Here the values of the constant $Q_1$ (e.g. 0.042) and the constant $Q_2$ (e.g. $-0.128$) have been set by statistical processing. A step S303 calls for the program to return to a step S241 of FIG. 3(E), at which SW3 is set to logical "1". The switch SW3 remains at logical "1" from this point onward. In other words, the shape parameter set at the early stage of temperature measurement is used from now on.

When SW3=1 is found to hold at the step S205 in FIG. 3(B), curve analysis processing is executed at a step S400.

Curve Analysis Processing

FIG. 4(B) is a flowchart illustrating curve analysis processing in accordance with the first embodiment of the invention. A step S401 calls for the coefficient parameter $A_0$ to be obtained using the presently prevailing sensed temperature data T8, and for this value to be stored in the register $A_0$. The value of coefficient parameter $A_0$ is obtained in accordance with the following equation:

$$A_0 = \frac{T_A t_A^\alpha - T8 \, t_i^\alpha}{t_A^\alpha - t_i^\alpha}$$

Next, a step S402 calls for the value of coefficient parameter $A_1$ to be obtained using the value of coefficient parameter $A_0$ obtained above, and for this value to be stored in the register $A_1$. The value of coefficient parameter $A_1$ is obtained in accordance with the following equation:

$$A_1 = T_A t_A^\alpha - A_0 t_A^\alpha$$

The following step S403 calls for the value of coefficient parameter $A_0'$ to be obtained using the sensed temperature data $T_0$ prevailing eight seconds earlier, and for this value to be stored in the register $A_0'$. The value of coefficient parameter $A_0'$ is obtained in accordance with the following equation:

$$A_0' = \frac{T_A t_A^\alpha - T_0 (t_i - 8)^\alpha}{t_A^\alpha - (t_i - 8)^\alpha}$$

The following step S404 calls for the value of coefficient parameter $A_1'$ to be obtained using the value of coefficient parameter $A_0'$ obtained above, and for this value to be stored in the register $A_1'$. The value of coefficient parameter $A_1'$ is obtained in accordance with the following equation:

$$A_1' = T_A t_A^\alpha - A_0' t_A^\alpha$$

The program then proceeds to a step S405, at which the program is returned to a step S500 in order that prediction processing may be executed, as described below.

Prediction Processing

FIG. 4(C) is a flowchart illustrating prediction processing in accordance with the first embodiment of the invention. A step S501 calls for the predicted temperature $T_p(t_D)$ at future time $t_D$ (e.g. 600 sec) to be obtained, and stored in the register $T_p$, using the value of shape parameter $\alpha$ and the presently prevailing value of coefficient parameters $A_0$, $A_1$. The predicted temperature $T_p(t_D)$ is obtained in accordance with the following equation:

$$T_p(t_D) = A_0 + A_1 / t_D^\alpha$$

Next, at a step S502, the predicted temperature $T_p(t_D)'$ at future time $t_D$ is obtained using the value of shape parameter $\alpha$ and the value of coefficient parameters $A_0'$, $A_1'$ prevailing eight seconds earlier. The predicted temperature $T_p(t_D)'$ is stored in the register $T_p'$. The predicted temperature $T_p(t_D)'$ is obtained in accordance with the following equation:

$$T_p(t_D)' = A_0' + A_1' / t_D^\alpha$$

A step S503 then calls for the program to return to a step S206, at which the predicted temperature $T_p(t_D)$ obtained is displayed.

From the step S206 the program proceeds to a step S207 in the flowchart of FIG. 3(C), at which it is checked whether SW4=1 holds. SW4 is a switch for processing in which the validity (consistency) of a predicted temperature is examined. If SW=1 does not hold at the step S207, the program proceeds to a step S250, at which it is determined whether the absolute value $\uparrow T_p - T_p' \uparrow$ of the difference between temperatures predicted at a time interval of eight seconds is equal to or less than q. If $\uparrow T_p - T_p' \uparrow$ does not hold, then the presently prevailing predicted temperature $T_p$ is not regarded as being approximately the same at the predicted temperature $T_p'$ eight seconds earlier (i.e. the predicted temperature $T_p$ is not valid). The program therefore returns to the step S108 in the flowchart of FIG. 3(A). If $\uparrow T_p - T_p' \uparrow \leq q$ does hold, however, the prediction is construed to be stable and the buzzer 14 is sounded at a step S251 to inform the user of the fact. The switch SW4 is then set to logical "1" at a step S252. The switch SW4 remains at logical "1" from this point onward so that the buzzer 14 is not sounded again. From this point onward the user is provided with a valid early display of temperature regardless of when the thermometer is removed from contact with the body. If the user wishes to end the temperature sensing operation early, the value being displayed at this time can be recognized as being the sensed temperature value. However, if the body moves during measurement to bring about an unstable condition in which a normal measurement cannot be taken, or if a slight fever is suspected and a more accurate prediction is required, temperature continues to be sensed. In such case, the program proceeds to the step S108 in FIG. 3(A). In response to the next timer interrupt, execution of the processing from the curve analysis step S400 to the predicted temperature display step S206 in FIG. 3(B) is repeated. The longer measurement is continued, therefore, the more the accuracy of the prediction is raised. When the condition $t_i > t_M$ (e.g. 600 sec) is eventually satisfied at the step S202, the sensed temperature data $T_O$ itself approaches the equilibrium temperature. From this time onward, therefore, continuing the prediction processing becomes meaningless. As a result, the program proceeds to a step S210, at which the data selector 13 (FIG. 2(B)) is connected to terminal B. From this moment onward, the sensed temperature $T_O$ per se is displayed.

Figure 8:
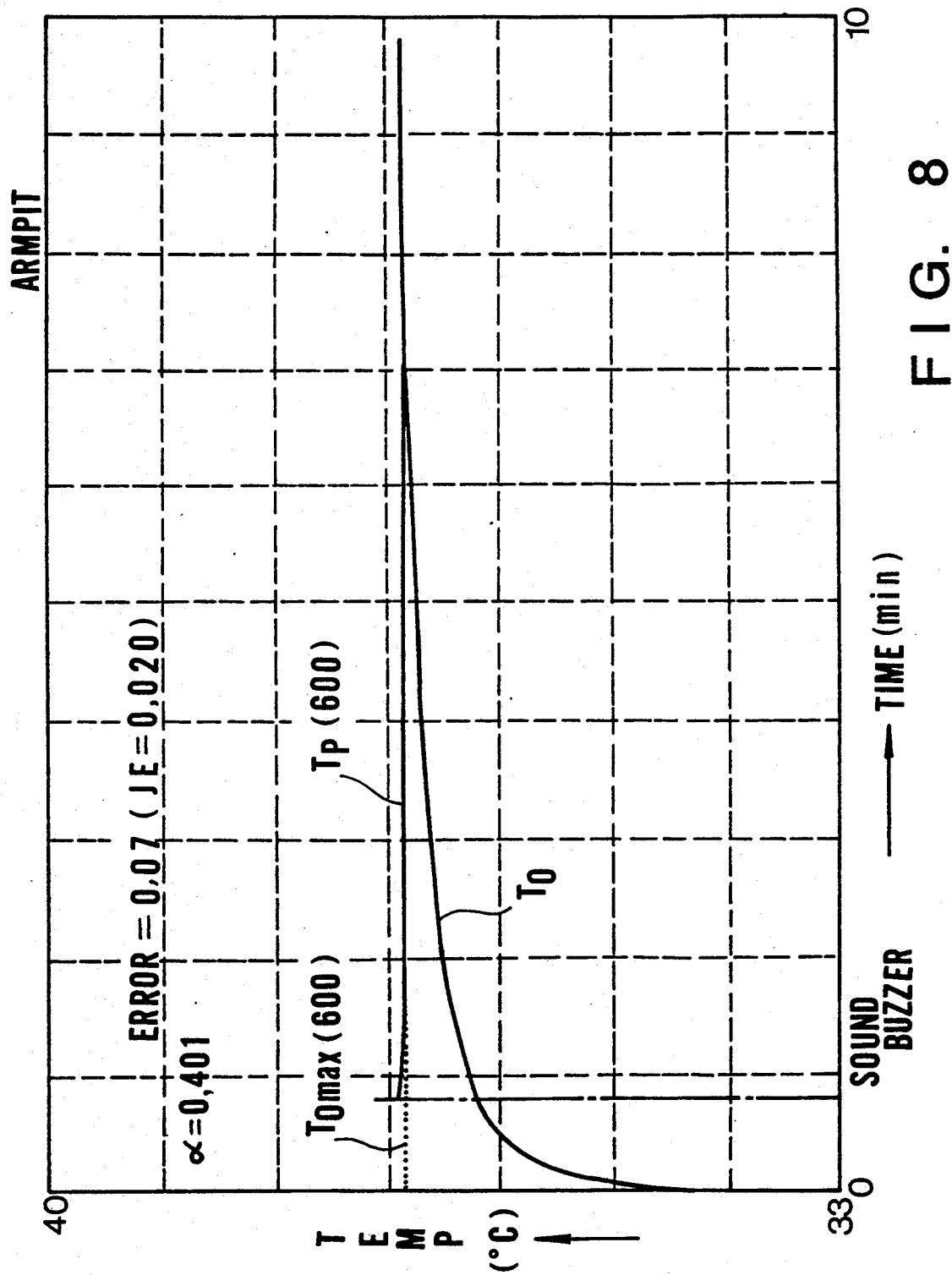
FIG. 8 is a graph showing an average temperature rise curve when temperature is sensed in an armpit by the electronic clinical thermometer of the first embodiment.
Figure 9:
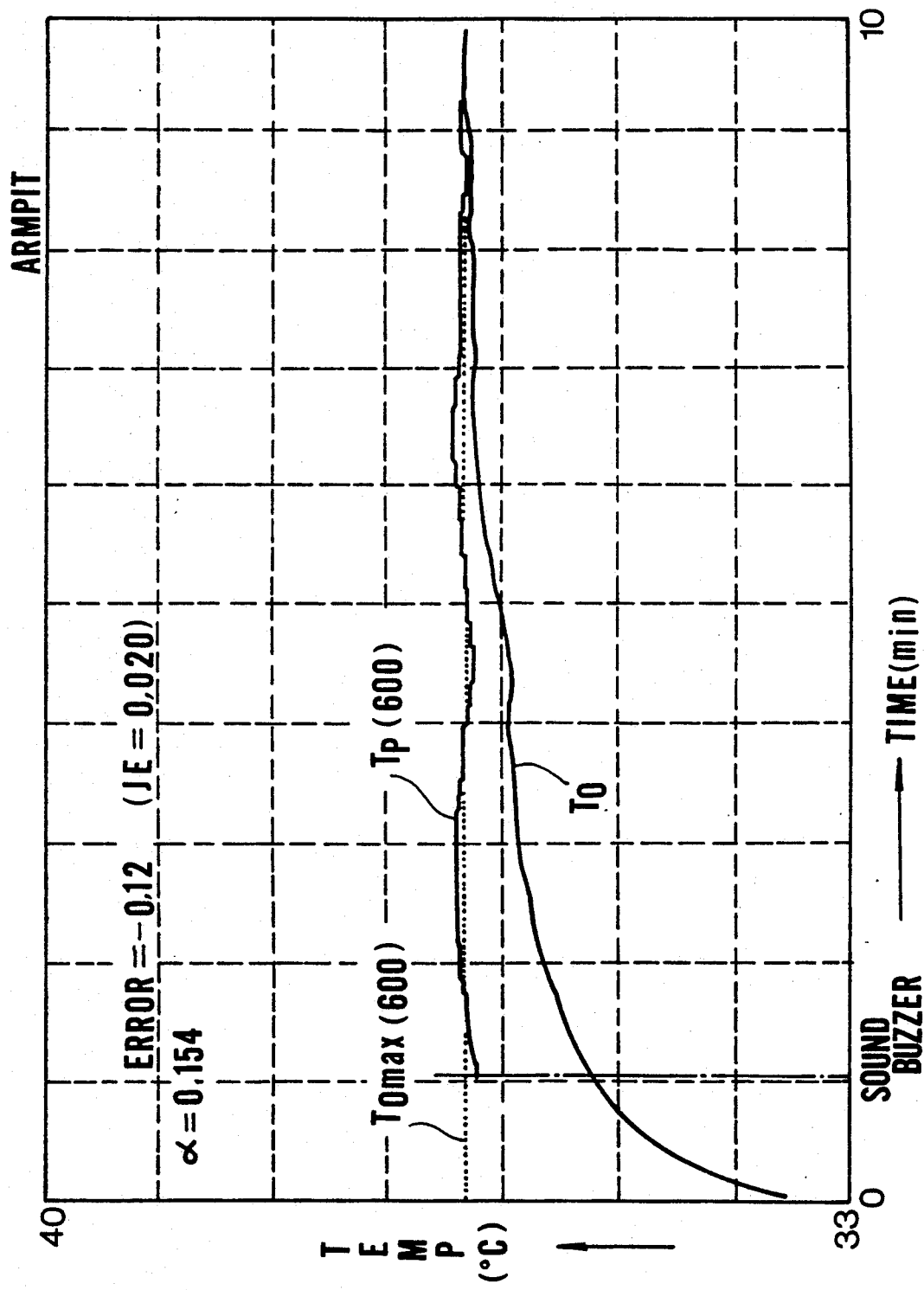
FIG. 9 is a graph showing a temperature rise curve, which fluctuates due to body movement, when temperature is sensed in an armpit by the electronic clinical thermometer of the first embodiment.
Figure 10:
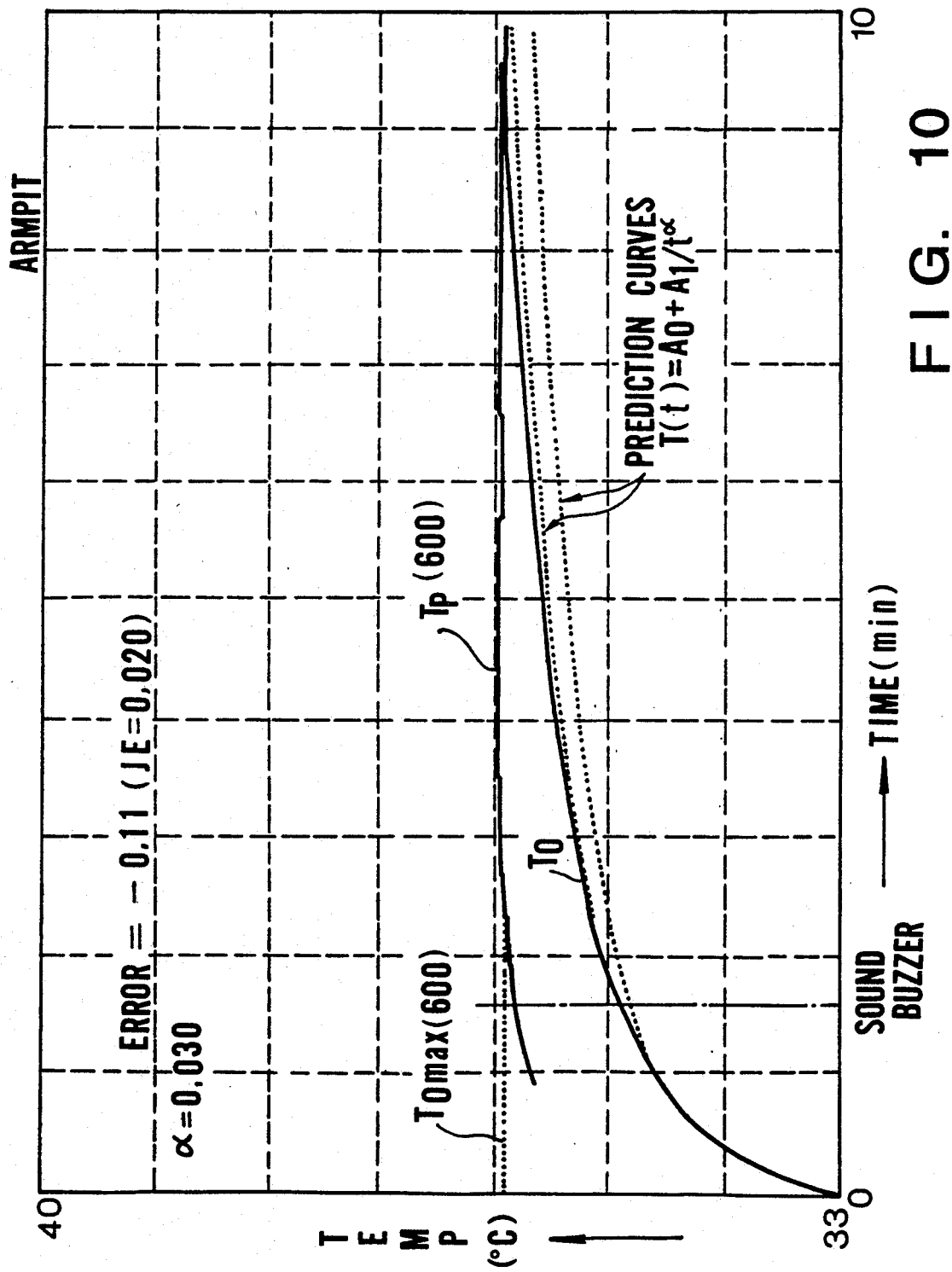
FIG. 10 is a graph showing a temperature rise curve, which indicates a very gentle rise, when temperature is sensed in an armpit by the electronic clinical thermometer of the first embodiment.

FIGS. 8 through 10 are graphs illustrating the progress of body temperature measurement taken in an armpit using the electronic clinical thermometer of the first embodiment. Elapsed measurement time t (min) is plotted along the horizontal axis, and temperature T (° C.) is plotted along the vertical axis. The graphs show the transition of the sensed temperature data $T_O$, the transition of the predicted value $T_p(600)$, namely the value predicted to prevail ten minutes (600 seconds) after the start of measurement, and the actually measured value $T_{Omax}(600)$ ten minutes (600 seconds) after the start of measurement. "ERROR" in these graphs is the difference between predicted value $T_p(600)$ and the actually measured value $T_{Omax}(600)$ at the moment the buzzer sounds (i.e. at the moment the prediction is construed to be valid). "JE" indicates an allowable value q ($\uparrow T_p - T_p' \uparrow \leq q$) used in judging the validity of the prediction [executed at step S250 in FIG. 3(C)]. If the prediction is valid, the buzzer is sounded.

FIG. 8 indicates a mean temperature rise curve. In accordance with FIG. 8, the mean temperature rise curve is stable and the automatic setting of the value of shape parameter $\alpha$ is precise. Accordingly, the predicted value $T_p(600)$ precisely represents the actually measured value $T_{Omax}(600)$ from the very moment the buzzer sounds. From this moment onward the transition is stable (approximately constant).

FIG. 9 illustrates a case where the temperature rise curve fluctuates due to body movement. Here the value of shape parameter $\alpha$ is set to 0.154 and the temperature rise curve exhibits a gentler rise than that of FIG. 8. In accordance with the invention, even in such cases as that shown in FIG. 9, the initial predicted value $T_p(600)$ that will prevail ten minutes after the start of measurement fluctuates only slightly in dependence upon the subsequent fluctuation of the temperature rise curve. The reason for this is that since the value of shape parameter $\alpha$ is set at an early stage of the temperature measurement through a reliable method, the value of coefficient parameters $A_0$, $A_1$ fluctuate very little in dependence upon the subsequent fluctuation of the temperature rise curve $T_O$. As a result, the predicted value $T_p(600)$ makes a stable transition. With the conventional method, the predicted value fluctuates widely in such cases. FIG. 10 illustrates a case where the temperature rise curve exhibits a very gentle rise. In cases such as this, the predicted value tends to be on the low side when the conventional prediction method is adopted. In accordance with the present embodiment, however, the value of the shape parameter $\alpha$ is set to a somewhat lower value, as a result of which the predicted value $T_p(600)$ tends to rise somewhat more steeply at the early stage of measurement and the buzzer activation time is automatically delayed, whereby excellent prediction accuracy can be obtained from the moment the buzzer sounds. The reason for this is that, in accordance with the present invention, the value of the shape parameter $\alpha$ is made to reflect the rising shape of the temperature rise curve, and the value of coefficient parameters $A_0$, $A_1$ of the prediction formula are set to values, which are based on actual measurement data, in accordance with the simultaneous equations.

Second Embodiment

In measurement of body temperature, the manner in which observed temperature varies from the start of measurement until the attainment of thermal equilibrium differs widely depending upon the thermal characteristics of the electronic clinical thermometer, the state of the part of the body being measured and the characteristics thereof. However, if the thermal characteristics of the thermometer are limited, the manner in which temperature varies can be broken down into several categories, the largest whereof are armpit measurement, oral measurement and rectal measurement.

The electronic clinical thermometer of the first embodiment described hereinabove can be applied as is to temperature measurement taken in an armpit, mouth, rectum or other region by virtue of the universal prediction method characterizing that thermometer. However, if the prediction method is modified and limited solely to one type of temperature measurement, such as measurement taken in an armpit, mouth or rectum, an improvement in the accuracy of temperature prediction can be expected.

A characterizing feature of the second embodiment of the invention resides in limiting body temperature measurement to e.g. armpit measurement, though measurement can be similarly limited to oral or rectal measurement. By doing so, the method of deciding the value of shape parameter $\alpha$ is actualized more precisely than in the first embodiment, thereby raising the accuracy of the prediction.

Another characteristic of the second embodiment is that the reliability of a predicted temperature is greatly improved by mitigating the effects of a fluctuation in temperature change brought about during an actual measurement of body temperature.

A further characteristic of the second embodiment is that the processing load on the system CPU is lightened greatly by simplifying or reducing the processing steps for predicting temperature.

Principle

If body temperature measurement is limited to measurement in e.g. an armpit, then a correlation between a group of temperature change curves and the value of shape parameter $\alpha$ can be stipulated more precisely. As a result, the shape recognition means will be capable of recognizing the shape of a temperature change curve more precisely, thereby raising the accuracy of the prediction processing.

Figure 14:
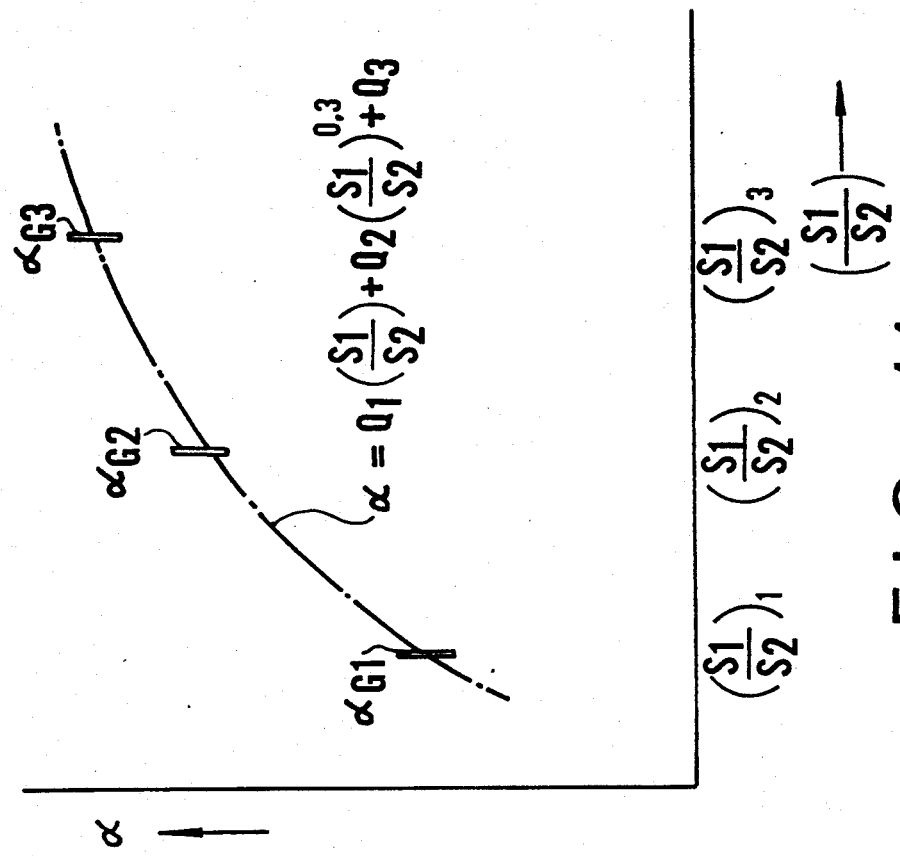
FIG. 14 is a graph showing the relationship between an optimum value of a shape parameter and a variable $(S_1/S_2)$ for deciding the shape parameter in the second embodiment.
Figure 12:
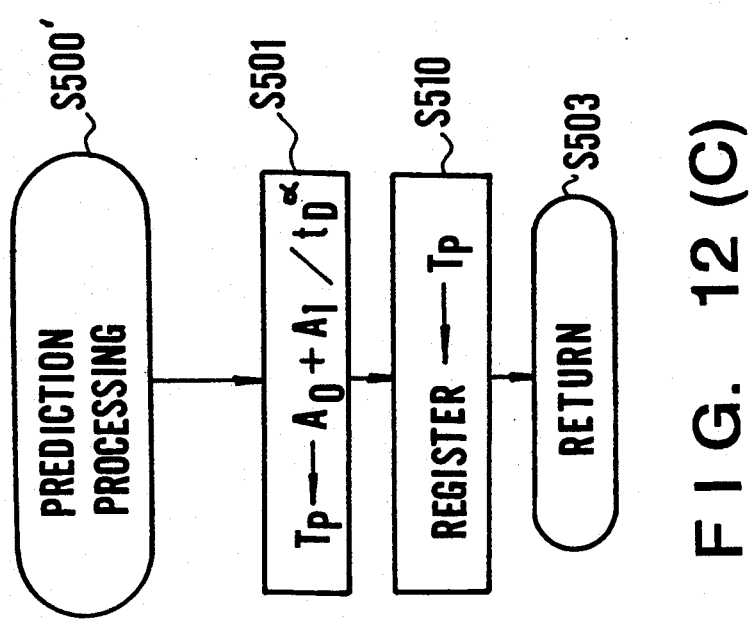

FIG. 14 is a graph showing the relationship between an optimum value of a shape parameter $\alpha$ and a variable $(S_1/S_2)$ for deciding the value of shape parameter in the second embodiment of the invention. The graph is obtained in the following manner: First, a large number of sensed temperature curves (preferably curves which are typical) indicative of temperatures actually measured in the armpits of a large number of people are prepared. Next, a given one of the sensed temperature curves is selected and inputted to the electronic clinical thermometer. At such time the value of shape parameter $\alpha$ is set to and fixed at any value. The electronic clinical thermometer uses this value of $\alpha$ to obtain the value of coefficient parameters $A_0$, $A_1$ by solving the following simultaneous equations:

$$T(t_1) = A_0 + A_1/t_1^\alpha$$

$$T(t_2) = A_0 + A_1/t_2^\alpha$$

based on temperature data $T(t_1)$, $T(t_2)$ at two different points and time data $t_1$, $t_2$ indicative of the corresponding points in time at which the temperatures were sensed. Further, the values of the coefficient parameters A, A successively obtained are used to determine e.g. a predicted value $T_p(600)$, which will prevail ten minutes hence, by using the predictive arithmetic expression $$T_p(t_D) = A_0 + A_1/t_D^\alpha$$

When prescribed conditions indicating the end of a temperature prediction [e.g. a state in which the predicted value $T_p(600)$ has stabilized] are satisfied, the predicted value $T_p(600)$ at such time and a known value $T_{OA}(600)$ actually measured ten minutes after the start of measurement are compared outside of the thermometer, whereby it is determined whether the prediction error $\gamma = \uparrow T_p(600) - T_{OA}(600)$ lies within a predetermined range. Next, the set value of the shape parameter $\alpha$ is changed and the foregoing procedure is repeated. The procedure is carried out for all possible values of the shape parameter $\alpha$, whereby there are obtained plural values of $\alpha$ (an $\alpha$ group) for which the prediction errors for a certain armpit temperature curve fall within the predetermined range.

Next, another armpit temperature curve is selected, the curve is inputted to the electronic clinical thermometer, and the above-described procedure is carried out, whereby there is obtained another $\alpha$ group for which the prediction errors for this other temperature curve fall within the predetermined range. The above procedure is repeated until all of the armpit temperature curves have been selected, thereby obtaining all groups of $\alpha$ for which the prediction errors for all armpit temperature curves fall within the predetermined range.

Apart from the above, the shape variables $(S_1/S_2)$ for all of the armpit temperature curves are detected, and correspondence is established between the shape variable $(S_1/S_2)$ and the groups of $\alpha$, using the temperature curves as an intermediary. This is shown in the graph of FIG. 14.

Next on the basis of the graph shown in FIG. 14, a relationship is established between the value of shape Parameter in the second embodiment and the shape variable $(S_1/S_2)$. It will be apparent from FIG. 14 that the shape of the graphed curve is an arc and not a straight line. The relation between $\alpha$ and $(S_1/S_2)$ is expressed in the form $$\alpha = C_1(S_1/S_2)^n + C_2$$

or $$\alpha = C_1(S_1/S_2) + C_2(S_1/S_2)^n + C_3$$

where
$n < 1$ : constant
$C_1 - C_3$: constants

Accordingly, in the second embodiment, the relation between the value of shape parameter $\alpha$ and the shape function $(S_1/S_2)$ is defined as follows:

$$\alpha = Q_1(S_1/S_2) + Q_2(S_1/S_2)^n + Q_3 \tag{12}$$

where $n < 1$ : constant
$Q_1 - Q_3$: constant

Each constant employed in the second embodiment is decided by regressive statistical processing with respect to the graphical characteristic of FIG. 14. For example, $n = 0.3$, $Q_1 = 0.04467$, $Q_2 = -0.330749$, $Q_3 = 0.393626$.

Construction

Figure 11:
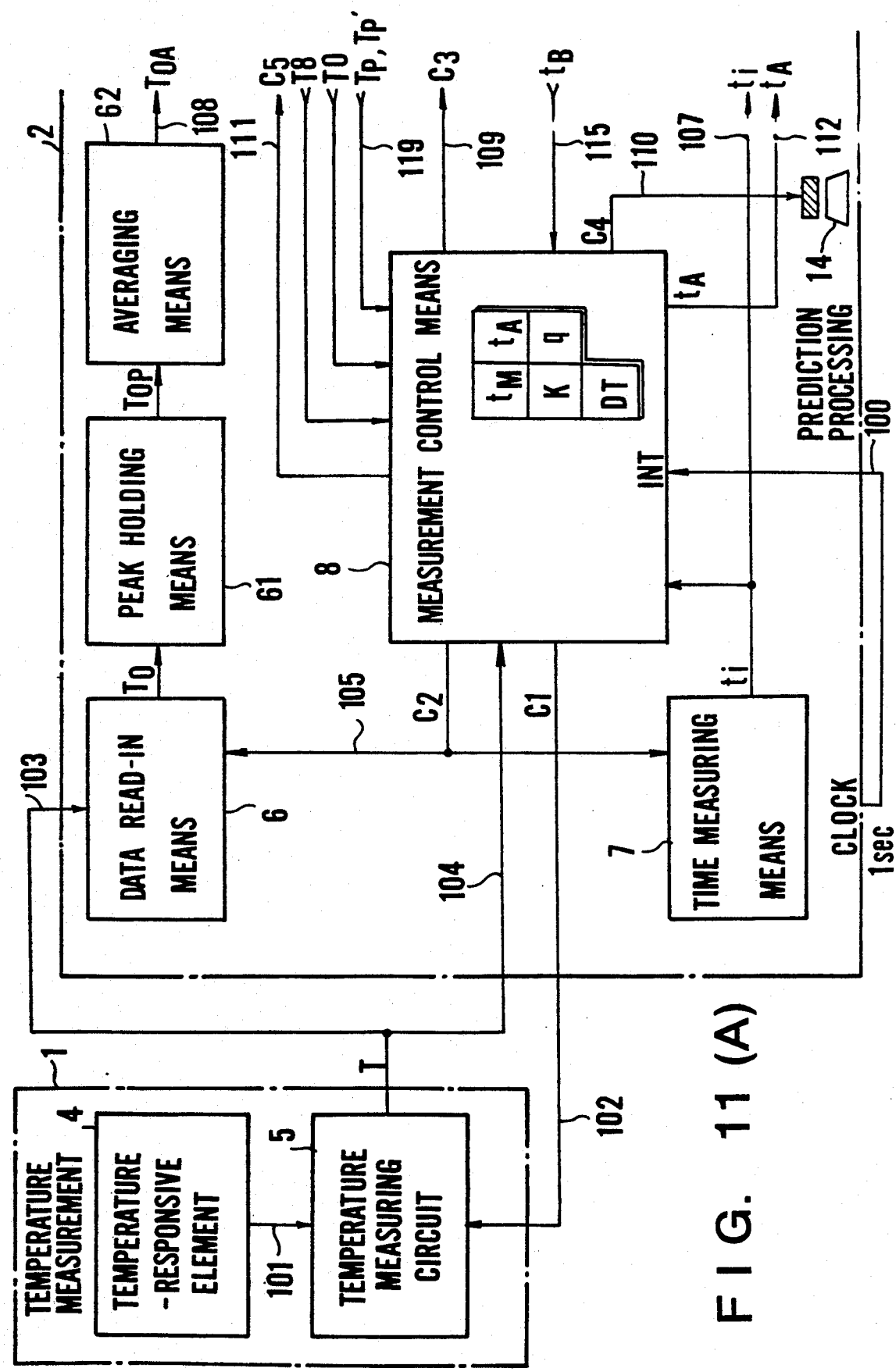
FIGS. 11(A) and 11(B) are block diagrams illustrating the specific construction of a second embodiment of the electronic clinical thermometer according to the invention.
Figure 11B:
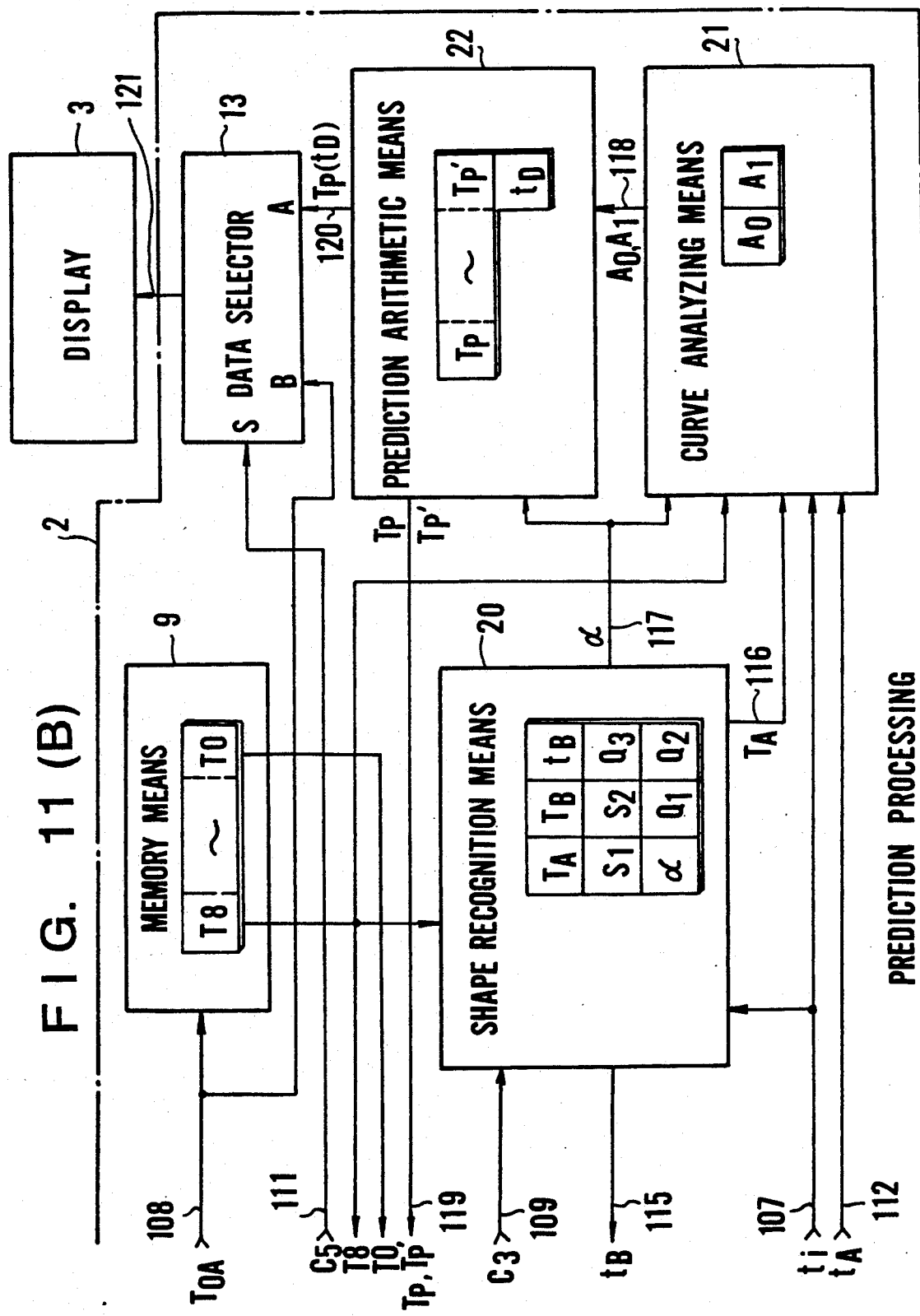

FIGS. 11(A) and 11(B) are block diagrams illustrating in detail the construction of an electronic clinical thermometer according to the second embodiment, in which portions similar to those shown in FIGS. 2(A) and 2(B) are designated by like reference characters. For the most part, these portions will not be described again unless they differ slightly in terms of function.

In FIGS. 11(A) and 11(B), the prediction processing section 2 further includes peak holding means 61 and averaging means 62. The shape recognition means, curve analyzing means and prediction arithmetic means are implemented in a way different from their counterparts in FIGS. 2(A) and 2(B) and are designated by numerals 20, 21, 22, respectively. The control means 8 causes the temperature measuring circuit 5 to generate the temperature data T at a rate of once every four seconds prior to the start of measurement (i.e. at the time of a preliminary measurement). As a result, the preliminary measurement period is shortened in comparison with the first embodiment to raise the precision of preliminary measurement. Two seconds is stored as a constant in the register $t_A$ of the measurement control means 8. The reason for this is so that the sensed temperature data $T_{OA}$ which can be used first will become effective two seconds after the start of measurement, owing to provision of the averaging means 62, described below.

The peak holding means 61 constantly detects and stores the highest temperature value contained in the sensed temperature data $T_O$ read in by the data read-in means 6. To accomplish this, the peak holding means 61 is provided with peak value memory means, not shown, for storing at least one peak value $T_{OP}$, and peak value comparing means, not shown, for comparing the magnitude of the peak value $T_{OP}$ stored in the peak value storing means with a newly inputted item of sensed temperature data $T_O$. Initially, the peak value storing means stores the sensed temperature data $T_O$ prevailing at the start of measurement (or a set value $T_C = 30.0°$ C., which is set on the assumption that measurement starting conditions have been satisfied) as the peak value $T_{OP}$. Next, when the latest item of sensed temperature data $T_O$ is inputted, the peak value comparing means compares this item of data and the peak value $T_{OP}$ stored in the peak value memory means. When the condition $T_O \geq T_{OP}$ is satisfied, the peak value memory means stores the new, i.e. latest, item of inputted temperature data $T_O$.

As the temperature measurement operation proceeds, the averaging means 62 determines a running average value $T_{OA}$ of the peak values $T_{OP}$ outputted by the peak holding means 61. To this end, the averaging means 62 is provided with peak data memory means, not shown, for constantly storing a predetermined number of consecutive peak values $T_{OP} - T_{OP}'$, peak value adding means for adding the predetermined number of peak values $T_{OP} - T_{OP}'$ stored in the peak data memory means, and dividing means, not shown, for dividing the sum calculated in the peak value adding means by a predetermined number of peak values. The peak data memory means is adapted to store the latest peak value $T_{OP}$ at each sampling instant and simultaneously erase the oldest peak value $T_{OP}'$ already stored therein. By way of example, therefore, the peak data storing means stores a peak value $T_{OP0}$ at an initial sampling instant (t=0 sec), the peak value $T_{OP0}$ and a peak value $T_{OP1}$ at the next sampling instant (t=1 sec), and the peak values $T_{OP0}$, $T_{OP1}$ and a peak value $T_{OP2}$ at the next sampling instant (t=2 sec). At this time (t=2sec), the peak value adding means outputs an initial sum $T_{OS1}$ (= $T_{OP0} + T_{OP1} + T_{OP2}$), and the dividing means calculates and outputs an initial running average value $T_{OA1}$ (= $T_{OS1}/3$). At the next sampling instant (t=3 sec), the peak data memory means stores the peak values $T_{OP1}$, $T_{OP2}$, $T_{OP3}$. As a result, the peak value adding means outputs the next sum $T_{OS2}$ (= $T_{OP1} + T_{OP2} + T_{OP3}$), and the dividing means calculates and outputs the next running average value $T_{OA2}$ (= $T_{OS2}/3$).

Figure 13:
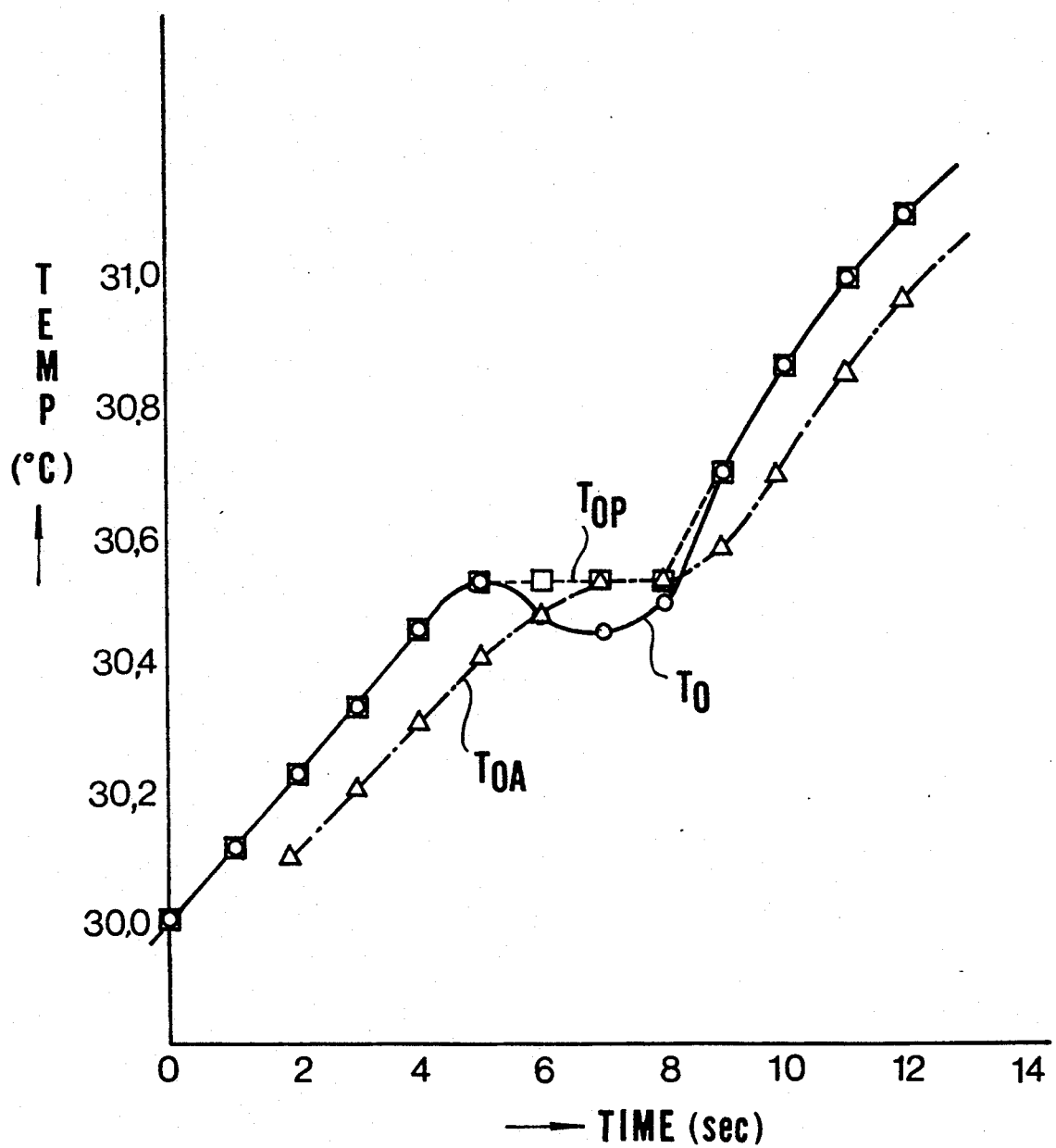
FIG. 13 is a graph showing the transitions of sensed temperature data $T_O$, peak data $T_{OP}$ and running average value $T_{OA}$ of the peak data in the second embodiment.

FIG. 13 is a graph showing the transitions of sensed temperature data $T_O$, peak data $T_{OP}$ and running average value $T_{OA}$ in the second embodiment of the invention. The graph shows that the curve of sensed temperature data $T_O$ passes through e.g. 30.0° C. at the start of measurement, thereafter rises monotonically until t=5 sec, at which the curve temporarily descends before rising again at t=7 sec. This indicates sensed temperature curve fluctuation as caused by body movement during an actual measurement. In general, very small fluctuations are removed by averaging processing. However, sensed temperature data having the pronounced dip shown in FIG. 13 are not useful in the prediction processing of the first and second embodiments and, moreover, have an adverse effect upon the results of the prediction. Even in such cases, though, the peak holding means 61 stores e.g. the peak value 30.5° C. at time t=5 sec and holds this value until time t=8 sec, so that the adverse influence due to the dip in the sensed temperature data can be removed in the prediction processing. Furthermore, in accordance with the second embodiment, peak-hold processing is executed before the data averaging processing, so that the actual sensed temperature curve $T_O$ and the peak value curve $T_{OP}$ are in good agreement over the entire region of measurement. This means that an averaging error is excluded. The fact that an averaging error is excluded is important at the early stage of measurement when the sensed temperature curve is rising steeply and is advantageous in that the delay in the rising shape of the running average value curve with respect to the rising shape of the sensed temperature curve can be quantitatively evaluated when this is required. Next, by taking the running average of the peak value curve $T_{OP}$, the averaging means 62 averages the fluctuation in the peak value curve $T_{OP}$ to provide a smooth sensed temperature curve for subsequent processing in the prediction processing section 2.

The memory means 9 constantly stores a total of nine items of sensed temperature data T8 through T0, including the most recent, while successively performing a shift-in/shift-out of the sensed temperature data $T_{OA}$, indicative of the running average value obtained by the averaging means 62, from register T8 to register T0 of the memory means.

By limiting measurement to that taken in e.g. an armpit, the shape recognition means 20 is capable of obtaining a precise correlation between the value of shape parameter $\alpha$ and the variable ($S_1/S_2$). More specifically, the register $\alpha$ in the shape recognition by performing the calculation $$\alpha = Q_1(S_1 S_2) + Q_2(S_1/S_2)^{0.3} + Q_3$$

The shape recognition means 20 is additionally provided with a register Q3 in order to store the constant $Q_3$.

The registers $A_0'$, $A_1'$ for storing the value of coefficient parameters $A_0'$, $A_1'$ prevailing eight seconds earlier are deleted from the curve analyzing means 21, and the processing for determining the value of coefficient parameters $A_0'$, $A_1'$ is dispensed with. This is to lighten the processing load on the processing section 2.

The prediction arithmetic means 22 is provided with predicted value memory means for storing nine consecutive predicted values $T_p(t_D) - T_p(t_D)'$. The predicted value memory means is adapted to constantly store the nine consecutive predicted values $T_p(t_D) - T_p(t_D)'$ so as to store the latest predicted value $T_p(t_D)$ calculated at each sampling instant and simultaneously erase the oldest predicted value $T_p(t_D)'$ already stored therein. Thus, the prediction arithmetic means 22 is relieved of the processing for determining the predicted value $T_p(t_D)'$ based on the temperature data prevailing eight seconds earlier. This greatly lightens the processing burden on the processing section 2. In this regard, the electronic clinical thermometer of the first embodiment need not have the stored value memory means of the second embodiment since it is capable of effectively utilizing the temperature data T8 — T0 in memory means 9.

Operation

Figure 12:
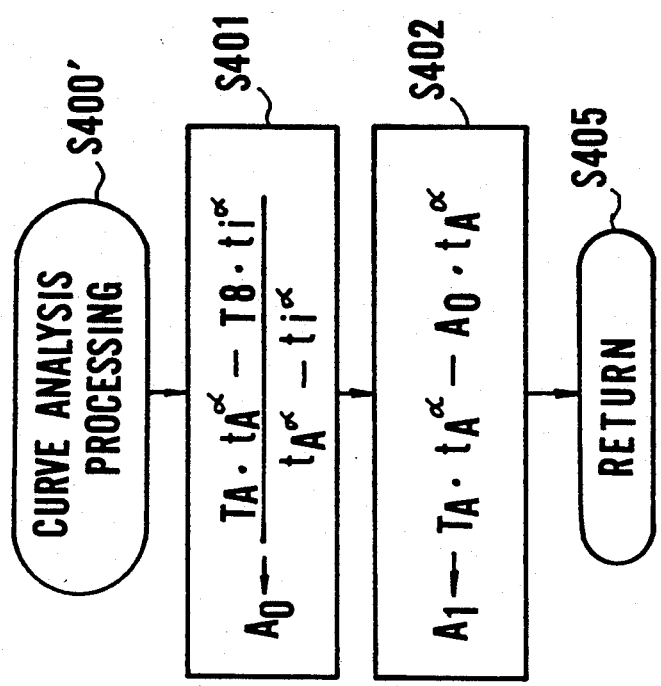
FIGS. 12(A)-12(C) are flowcharts showing shape recognition processing, curve analysis processing and prediction processing executed in the second embodiment of the electronic clinical thermometer.
Figure 12:
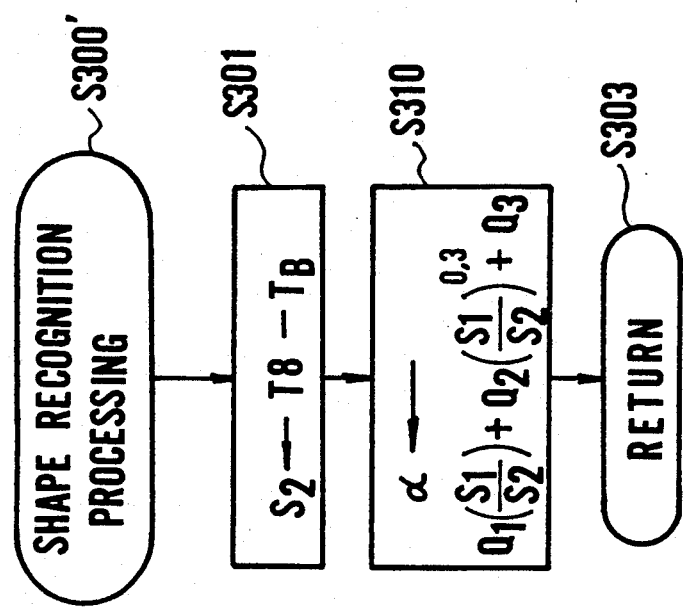

FIGS. 12(A) through (C) are flowcharts illustrating shape recognition processing, curve analysis processing and prediction processing in accordance with the second embodiment. Since the main flow in the second embodiment is arranged in the same manner as the main flow in FIGS. 3(A) through 3(E), the latter will also be employed in the description that follows. Accordingly, the overall operation of the second embodiment will be described upon substituting shape recognition processing S300', curve analysis processing S400' and prediction processing S500' in FIGS. 12(A)–(C) for the shape recognition processing S300, curve analysis processing S400 and prediction processing S500, respectively, in FIGS. 3(B) and 3(E). Portions whose functions differ from those of the first embodiment will be described.

In the preliminary measurement step S101 of FIG. 3(A), the measurement control means 8 causes the temperature measurement circuit 5 to sense temperature at a rate of once every four seconds. This is to shorten the preliminary measurement period and raise the accuracy of the preliminary measurement. Step S102 calls for a determination as to whether a predetermined temperature of 30° C. has been exceeded, and step S103 a determination as to whether the temperature rise is greater than 0.32° C. over the period of four seconds. In accordance with the second embodiment, whether the temperature rise is greater than 0.32° C. is checked in order to deal with the fact that the preliminary measurement period has been shortened to four seconds. The peak holding function of the peak holding means 61 and the averaging function of the averaging means 62 are also activated at step S107. The step S210 in FIG. 3(B) calls for a display of the sensed temperature data $T_{OA}$ following the processing executed by the peak holding means 61 and averaging means 62. Elapsed time of two seconds is checked for at step S220, at which it is determined whether $t_i = t_A$ holds. Since the averaging means 62 is provided in the second embodiment, the content of register $t_A$ is taken to be two seconds, which is the time at which the initial sensed temperature $T_{OA}$ can be used.

Shape Recognition Processing

Steps in FIG. 12(A) equivalent to those shown in FIG. 4(A) are designated by like step numbers and are not described again. A step S310 in FIG. 12(A) calls for the value of shape parameter α to be found by using the equation $$\alpha = Q_1(S_1/S_2) + Q_2(S_1/S_2)^{0.3} + Q_3$$

This greatly raises the accuracy of shape recognition for temperature measurement in an armpit.

In FIG. 12(B), the steps S403, S404 of FIG. 4(B) which use the sensed temperature data $T_0$ prevailing eight seconds earlier are deleted. Since the prediction arithmetic means 22 in the second embodiment is provided with the predicted value memory means capable of storing nine predicted values, it is unnecessary to obtain the value of coefficient parameters $A_0'$, $A_1'$ using the sensed temperature data T0 prevailing eight seconds prior to the present. This serves to lighten the processing burden on the processing section 2 by a wide margin.

Prediction Processing

In FIG. 12(C), the steps equivalent to those shown in FIG. 4(C) are designated by like steps numbers and are not described again. Deleted from FIG. 12(C) is the step S502 of FIG. 4(C) which uses the sensed temperature data T0 prevailing eight seconds earlier. This step is replaced by a step S510, at which the latest predicted temperature $T_p(t_D)$ is stored in the predicted value memory means and the predicted temperature $T_p(t_D)'$, calculated and stored eight seconds earlier, is erased.

Third Embodiment

As set forth in the first embodiment, various other methods of setting the value of shape parameter α can be conceived. A characterizing feature of the third embodiment resides in actualizing, in greater detail, a method of expressing the value of shape parameter α by temperature slopes at predetermined times after the start of measurement or plural items of temperature data at predetermined times after the start of measurement, as touched upon in the description of the first embodiment.

Another characterizing feature of the third embodiment resides in limiting body temperature measurement to oral measurement, though measurement can be similarly limited to armpit or rectal measurement. Another method of deciding the value of shape parameter α is applied to this measurement.

Another characterizing feature of the third embodiment is that the effects of a fluctuation in temperature change are mitigated and the processing load on the processing section 2 is greatly reduced, as in the second embodiment.

Principle

Figure 17:
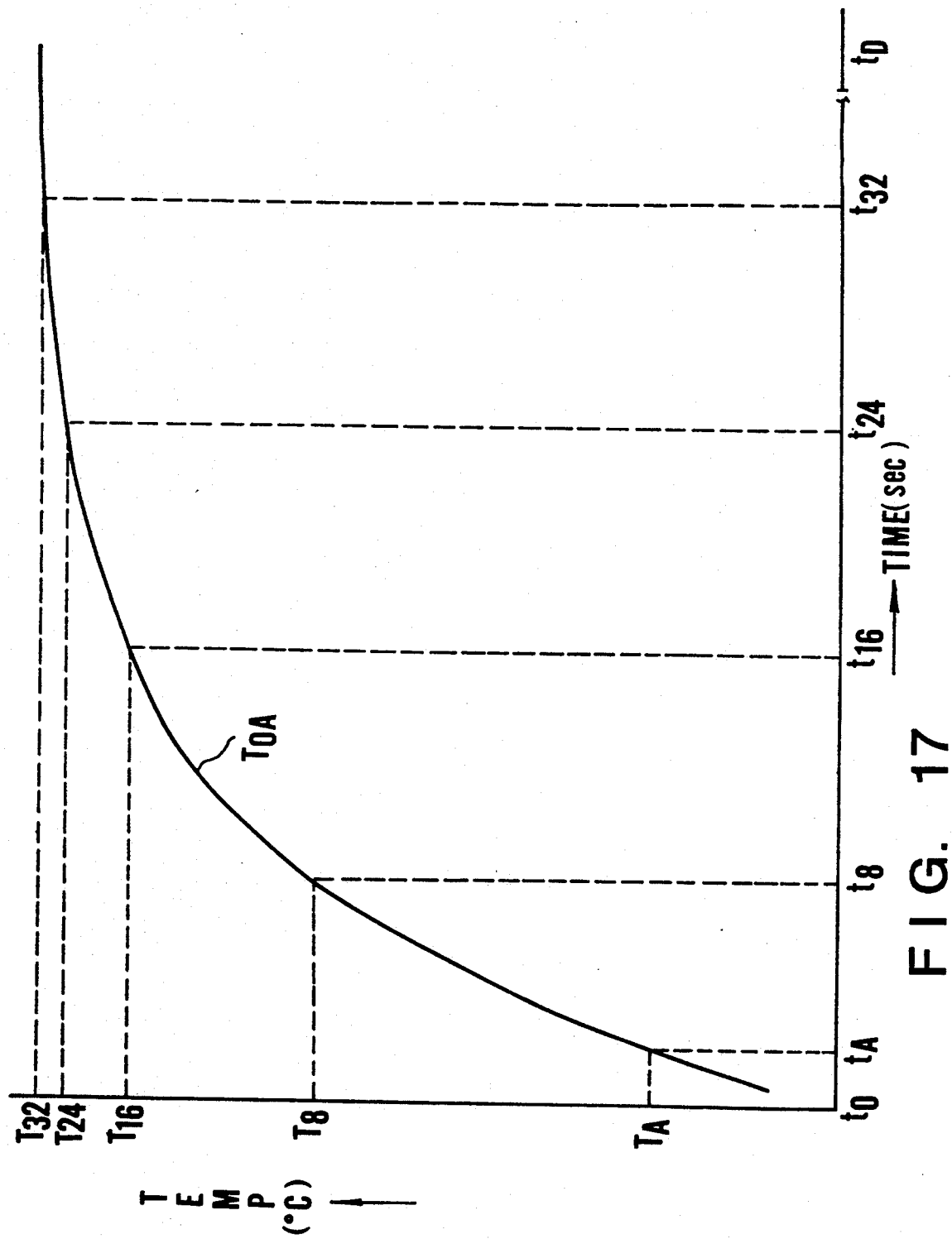
FIG. 17 is a graph showing a plot of plural items of sensed temperature data at predetermined times after the start of temperature measurement in the third embodiment.

FIG. 17 is a graph showing a plot of plural items of sensed temperature data at predetermined times after the start of temperature measurement in accordance with the third embodiment. As set forth in the first embodiment, a plurality of temperature rise curves can be distinguished from one another by ascertaining the shapes of the sensed temperature rises from the moment measurement starts. Accordingly, in the third embodiment of the invention, the value of shape parameter α is expressed based on plural items of temperature data at predetermined points in time, as shown in FIG. 17.

There are several methods of ascertaining the sharpness of the shape of sensed temperature rise. In one method, a set of actual measurement data is employed as is and is quantified or compared with a reference. In another, a set of actual measurement data is observed in relation to a time axis (i.e. is subjected to differentiation of the first order) to obtain information relating to the rate of temperature change, and the information is quantified or compared with a reference. In yet another conceivable method, a set of plural rates of temperature change taken from actual measurement data is observed in relation to a time axis (i.e. is subjected to differentiation of the second order) to obtain information relating to the acceleration of temperature change, and the information is quantified or compared with a reference. Whichever method is used, it is desired that information which stipulates the relationship between the value of shape parameter and variables be linear, considering the processing capability of single-chip CPUs presently available. Fortunately, when a differential term is included, obtaining the linear relationship can be realized through simple processing. Specifically, differentiation of the first order in e.g. the interval $t_8 - t_{16}$ in FIG. 17 can be performed by employing the difference $(T_{16} - T_8)$ between the items of sensed temperature data prevailing at these times, and quadratic differentiation in the interval $t_8 - t_{24}$ can be performed in the form $(T_{24} - T_{16} - (T_{16} - T_8))$. *Accordingly, in the third embodiment, the relation be-* tween the value of shape parameter $\alpha$ and variable $X_k$ is defined as follows:

$$\alpha = \sum_{k=0}^{4} D_k X_k + D_5 \quad (13)$$

where
$D_0$–$D_5$: constants
$X_0 = T_8$, $X_1 = T_{16}$
$X_2 = T_{24}$, $X_3 = T_{32}$
$X_4 = (X_3 - X_0)/(X_1 - X_0)$ In the above, $T_8$–$T_{32}$ are items of sensed temperature data $T_{OA}$ at times $t = 8$ sec, 16 sec, 24 sec and 32 sec, respectively, by way of example. The plural items of sensed temperature data $T_8$–$T_{32}$ preferably are sampled over a range covering a region in which the sharpnesses of the shapes of sensed rises in temperature after the start of measurement are effectively ascertained and distinguished from one another. Preferably, the range is made as short as possible in order to express the initial predicted temperature $T_p$ at an earlier point in time. Further, the number of variables $X_0$–$X_4$, the sampling interval and the shape preferably are decided within a range which will not burden the processing section 2 with excessive processing. The constants $D_0$–$D_5$ in the third embodiment are decided on the basis of the statistical processing considered hereinabove. Examples of the constants are as follows: $D_0 = -0.02566$, $D_1 = 0.01601$, $D_2 = 0.03003$, $D_3 = 0.35019$, $D_4 = 0.08913$, $D_5 = -12.9657$.

Construction

Figure 15:
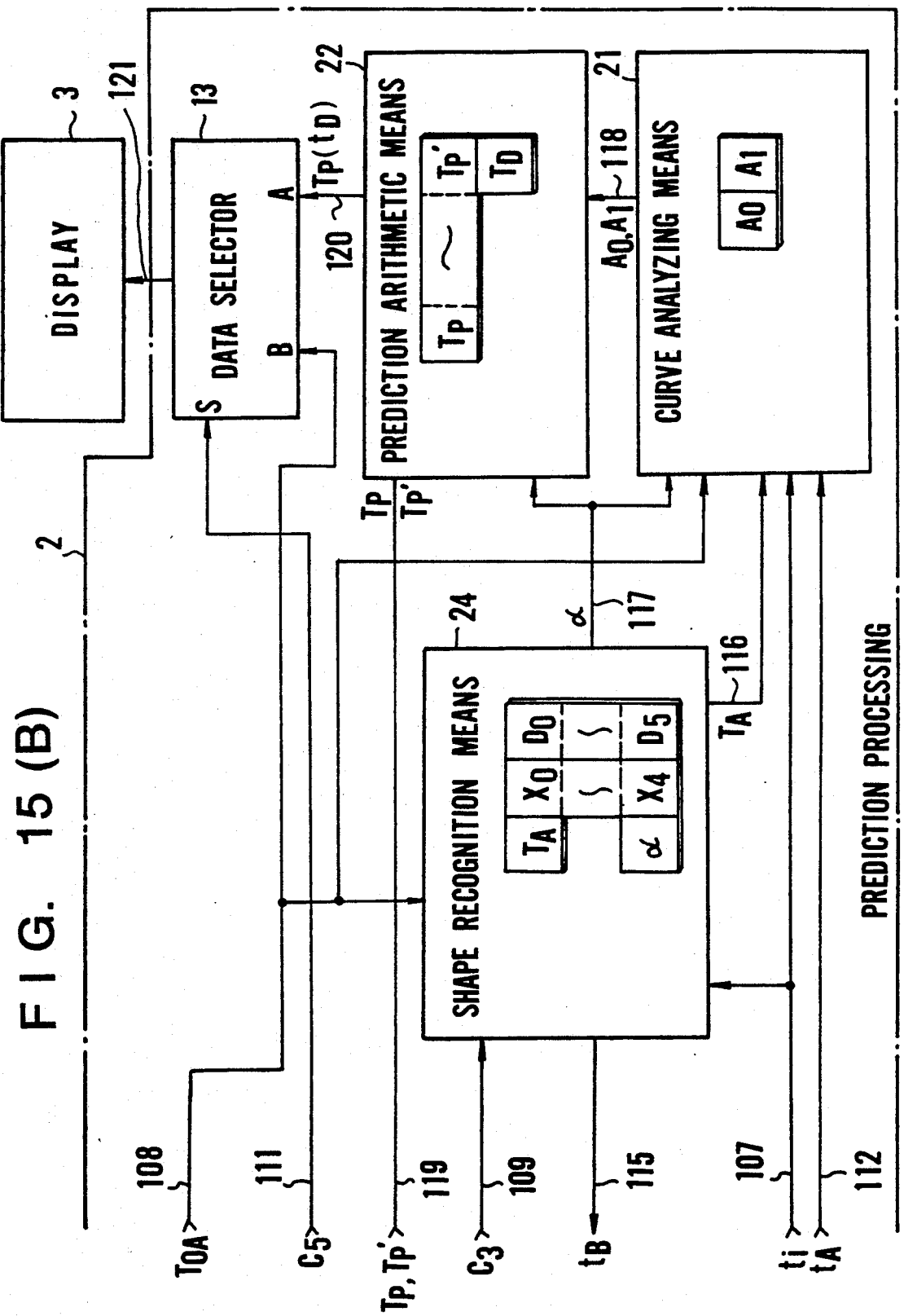
FIGS. 15(A) and 15(B) are block diagrams illustrating the specific construction of a third embodiment of an electronic clinical thermometer according to the invention.

FIGS. 15(A) and 15(B) are block diagrams illustrating in detail the construction of an electronic clinical thermometer according to the third embodiment, in which portions similar to those in the second embodiment of FIG. 11 are designated by like reference characters and will not be described again.

In FIGS. 15(A) and 15(B), the memory means 9 of FIG. 11(B) is deleted from the prediction processing section 2, which in this embodiment is provided with measurement control means 23 and shape recognition means 24 implemented in a way different from their counterparts in FIGS. 11(A) and 11(B).

In the measurement control means 23, the registers $t_8$–$t_{32}$ store constants indicative of predetermined times at which the plural items of temperature data are to be sampled. Examples of the constants are $t_8 = 8$ sec, $t_{16} = 16$ sec, $t_{24} = 24$ sec, $t_{32} = 32$ sec. It should be noted that the predetermined constants are not limited to these alone. A register I is an index register. The contents of the register I index and refer to the contents of the registers $t_8$–$t_{32}$ and are used for other purposes as well, as will be described below. By limiting measurement to e.g. oral measurement, the shape recognition means 24 is capable of obtaining a more precise correlation between the value of shape parameter $\alpha$ and variable $X_k$. More specifically, the register $\alpha$ of the shape recognition means 24 stores the value of shape parameter $\alpha$ obtained by performing the calculation expressed by the following equation:

$$\alpha = \sum_{k=0}^{4} D_k X_k + D_5$$

The shape recognition means 24 is provided with registers $X_0$–$X_4$ for storing variables $X_0$–$X_4$, and with registers $D_0$–$D_5$ for storing constants $D_0$–$D_5$.

Operation

Figure 16:
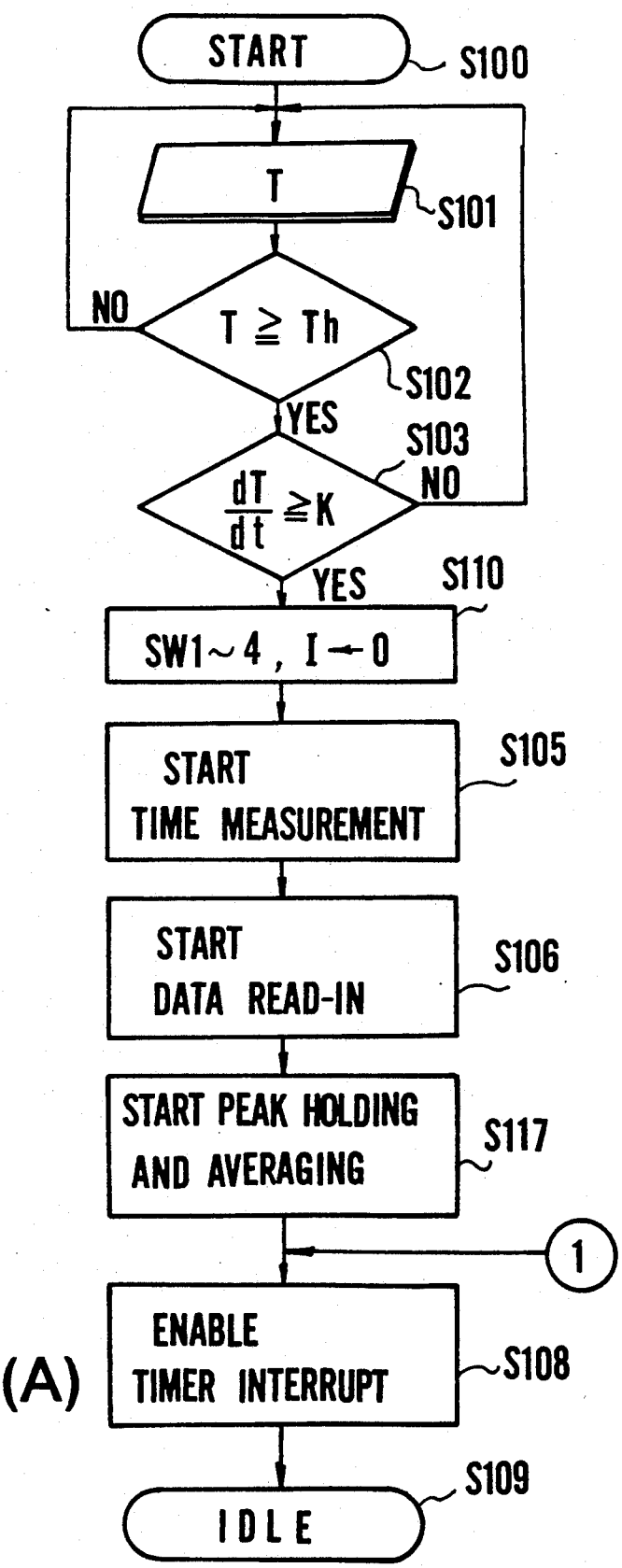
FIGS. 16(A)-16(E) are flowcharts illustrating a temperature sensing process executed in the third embodiment of the electronic clinical thermometer.
Figure 16:
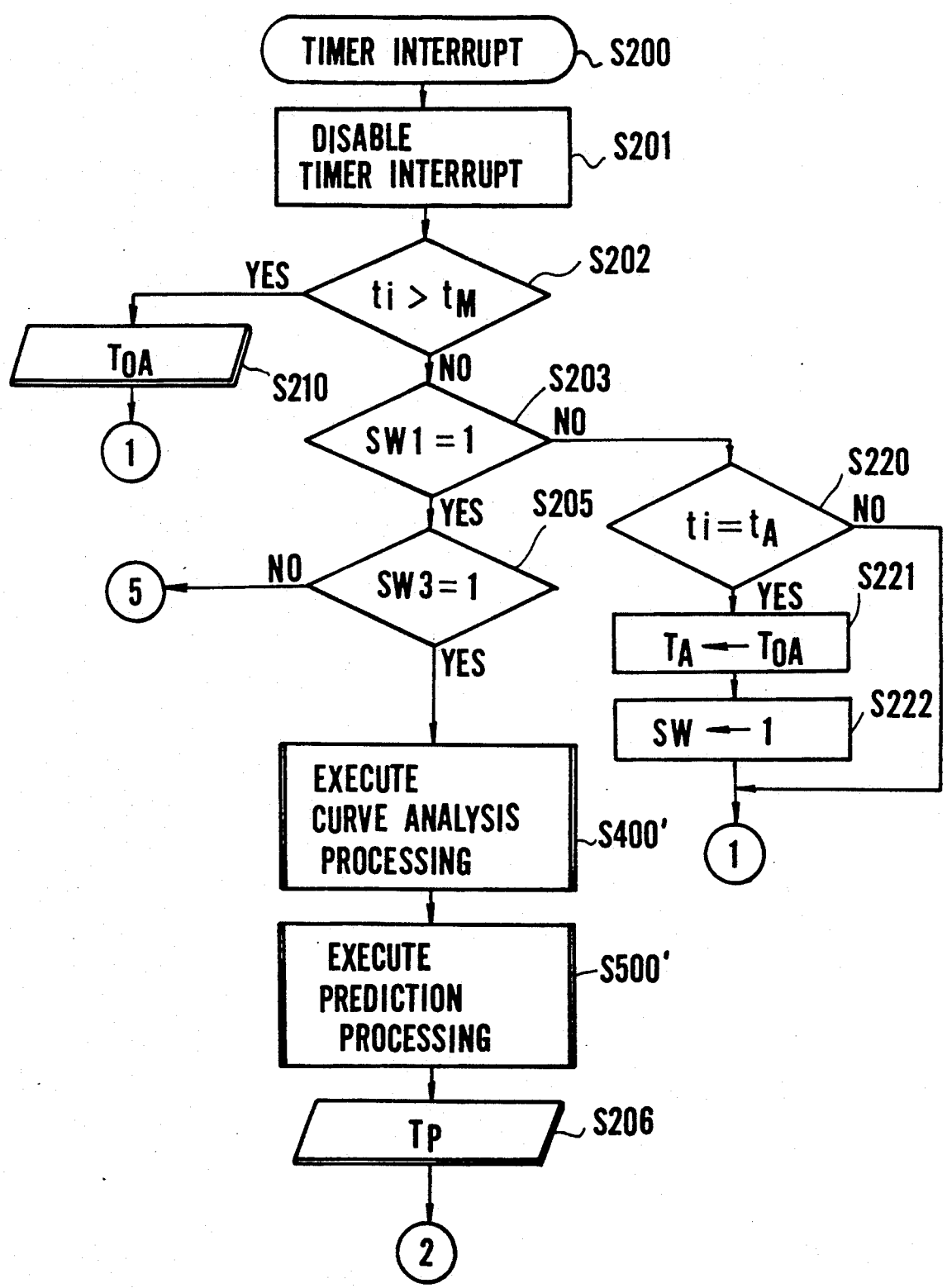
Figure 16:
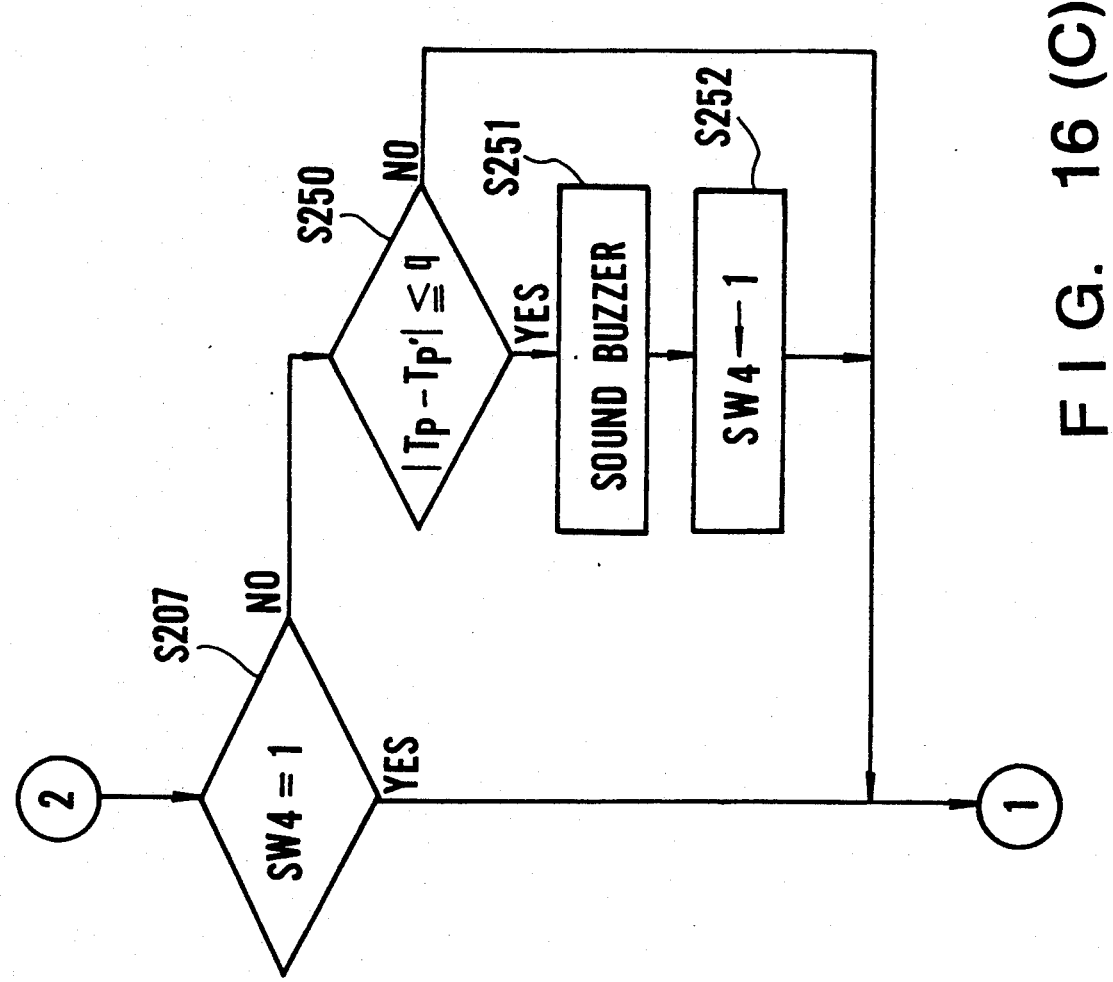
Figure 16:
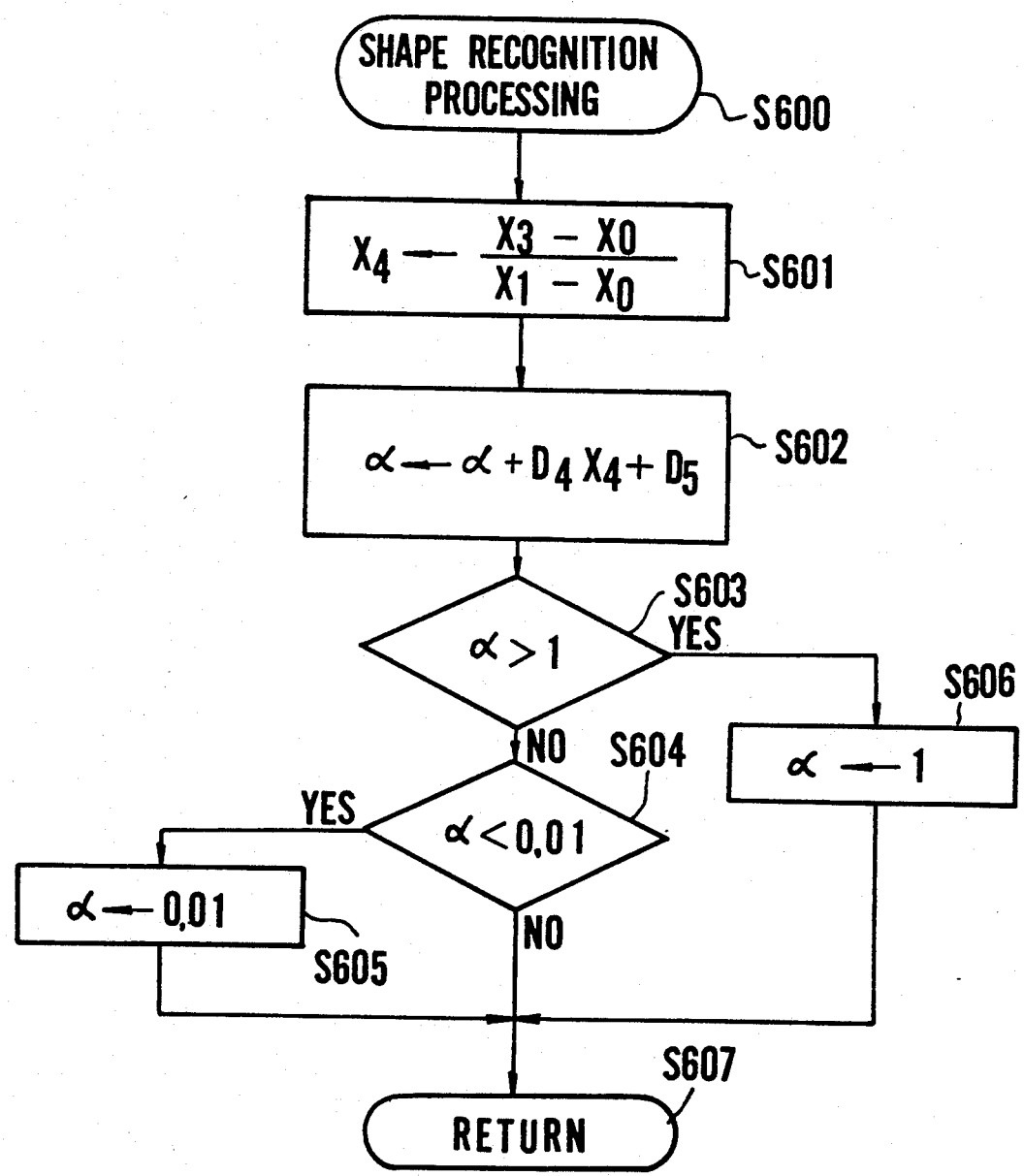
Figure 16:
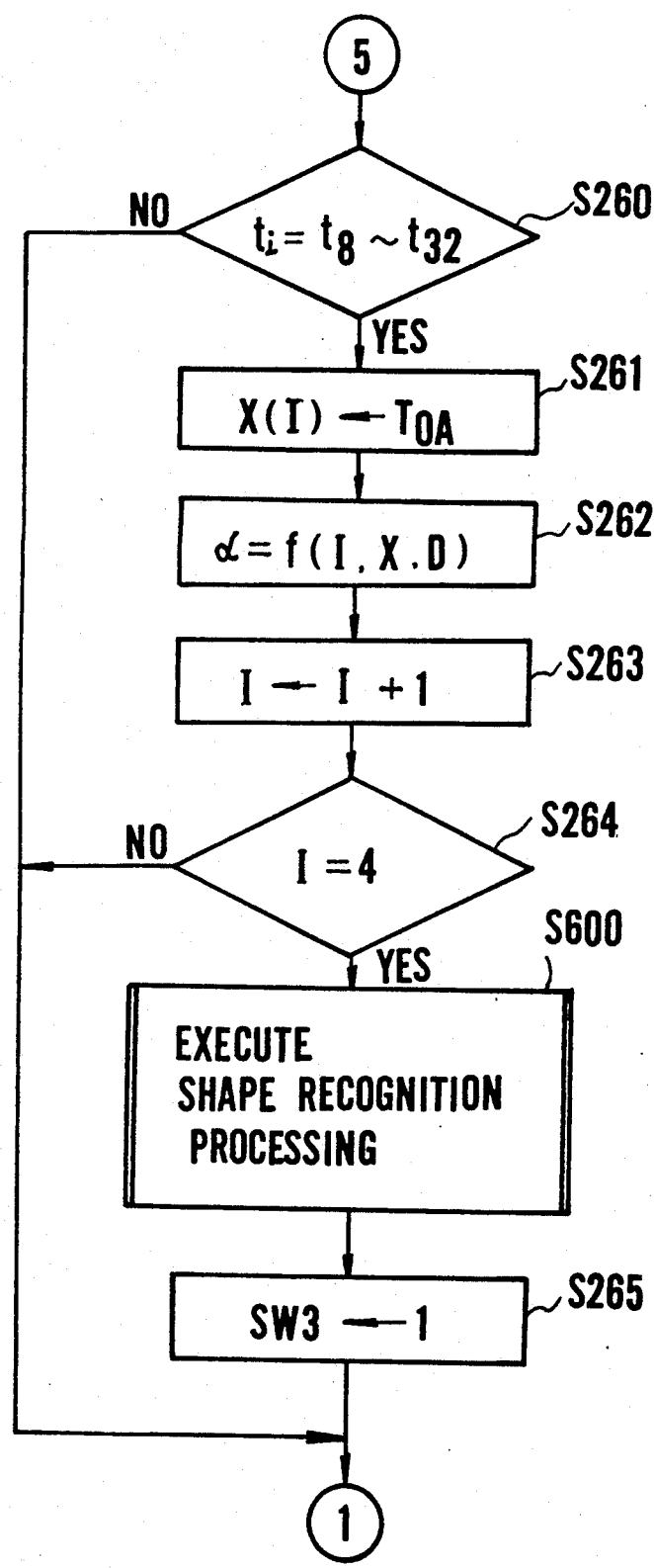

FIGS. 16(A)–16(E) are flowcharts illustrating temperature sensing processing performed by the electronic clinical thermometer of the third embodiment. In FIG. 16(A), steps equivalent to those shown in FIG. 3(A) are designated by like step numbers and need not be described again. Steps having the same step numbers as those in the first embodiment but differing somewhat in terms of function will be described.

In the temperature measurement step S101 of FIG. 16(A), the measurement control means 23 causes the temperature measurement circuit 5 to sense temperature at a rate of once every four seconds. Step S102 calls for a determination as to whether a predetermined temperature of 30° C. has been exceeded, and step S103 a determination L- as to whether the temperature rise is greater than 0.32° C. over the period of four seconds. If YES answers are received at the steps S102, S103, then the program proceeds to a step S110, at which the various program switches SW1–SW4 for measurement control and the contents of the index register I are cleared. The peak holding function of the peak holding means 61 and the averaging function of the averaging means 62 are activated at a step S117.

When the timer interrupt is generated at the step S109 in FIG. 16(A), the program proceeds to the step S200 in FIG. 16(B). The sensed temperature $T_{OA}$ is displayed at the step S210 in FIG. 16(B). Elapsed time of two seconds is checked for at the step S220, at which it is determined whether $t_i = t_A$ holds. The sensed temperature data $T_{OA}$ is stored in the register $T_A$ at the step S221. This is because the memory means 9 is not provided in the third embodiment.

It is checked at the step S205 whether SW3 = 1 holds. In the third embodiment, SW3 is a switch for storing plural items of temperature data at predetermined points in time after the start of temperature measurement, and for ascertaining the sharpness of the rising shape of the sensed temperature curve at a comparatively early point in time after the start of temperature measurement (i.e. for deciding the value of shape parameter $\alpha$). When SW3 = 1 does not hold, the program proceeds to a step S260 in FIG. 16(E), at which it is checked whether $t_i$ is equal to any one of $t_8$, $t_{16}$, $t_{24}$, $t_{32}$. This decision step is executed while the contents of registers $t_8$–$t_{32}$ in measurement control means 23 are indexed and referred to in accordance with the contents of the index register I. More specifically, initially I = 0 and the system waits for the condition $t_i = 8$ sec to be established. When the condition $t_i = 8$ sec does not hold, the data thus far are useless for shape recognition, so that the program returns directly to the step S108. When the condition $t_i = 8$ sec is eventually established, an YES answer is received at the step S260 and the program proceeds to a step S261, at which the sensed temperature data $T_{OA}$ (initially $T_8$) are stored in the register $X_n$ of shape recognition means 24 in accordance with the contenss of the index register I. That is, since I = 0 initially, $T_8$ is stored in the register $X_0$. Next, in accordance with the contents of the index register I, and in a manner similar to the foregoing, the shape recognition means 24 executes a partial calculation, namely $\alpha = f(I, X, D)$, for deciding the value of shape parameter at a step S262. That is, since I = 0 initially, the partial calculation $\alpha = (D_0 X_0)$ is performed. Next, 1 is added to the contents of the index register I at a step S262, and it is determined at a step S264 whether I=4 holds; if it does not, the program returns to the step S108. Thus, processing identical with the foregoing is executed successively at each of the predetermined points in time. In other words, since I=1 at the next predetermined time $t_i=16$ sec, $T_{16}$ is stored in register $X_1$ at the step S261, $(D_1 X_1)$ is added to the contents of the register $\alpha$ at the step S262, and 1 is added to the contents of index register I at the step S263. Since I=2 at the next predetermined time $t_i=24$ sec, $T_{24}$ is stored in register $X_2$ at the step S261, $(D_2 X_2)$ is added to the contents of the register $\alpha$ at the step S262, and 1 is added to the contents of index register I at the step S263. Since I=3 at the next predetermined time $t_i=32$ sec, $T_{32}$ is stored in register $X_3$ at the step S261, $(D_3 X_3)$ is added to the contents of the register at the step S262, and 1 is added to the contents of index register I at the step S263. At this moment the condition I=4 is found to hold at a decision step S264, so that shape recognition processing of step S600, described below, is executed. In accordance with the third embodiment of the invention, this moment is always a point in time t=32 sec after the start of measurement.

Shape Recognition Processing

FIG. 16(D) is a flowchart illustrating shape recognition processing in accordance with the third embodiment of the invention. A step S601 calls for the variable $X_4=(X_3-X_0)/(X_1-X_0)$ to be stored in register $X_4$. Next, the remainder $(D_4 X_4 + D_5)$ is added to the contents of the register $\alpha$ at a step S602. The value of shape parameter $\alpha$ is thus calculated. It is then determined at a step S603 whether $\alpha > 1$ holds. If the latter does hold, $\alpha$ is clamped at 1 at a step S606; if it does not hold, then it is determined whether $\alpha < 0.01$ holds at a step S604. If the latter does hold, $\alpha$ is clamped at 0.01 at a step S605; if it does not hold, then the value of $\alpha$ obtained by the calculation at step S602 is used as is. The program returns to the main flow at a step S607. The switch SW3 it set to logical "1" at a step S265 [FIG. 16(E)]. This step S265 is not executed again. From this point onward, in other words, the prediction calculations continue, using the value of shape parameter $\alpha$ set early in the body temperature measurement operation.

Figure 18:
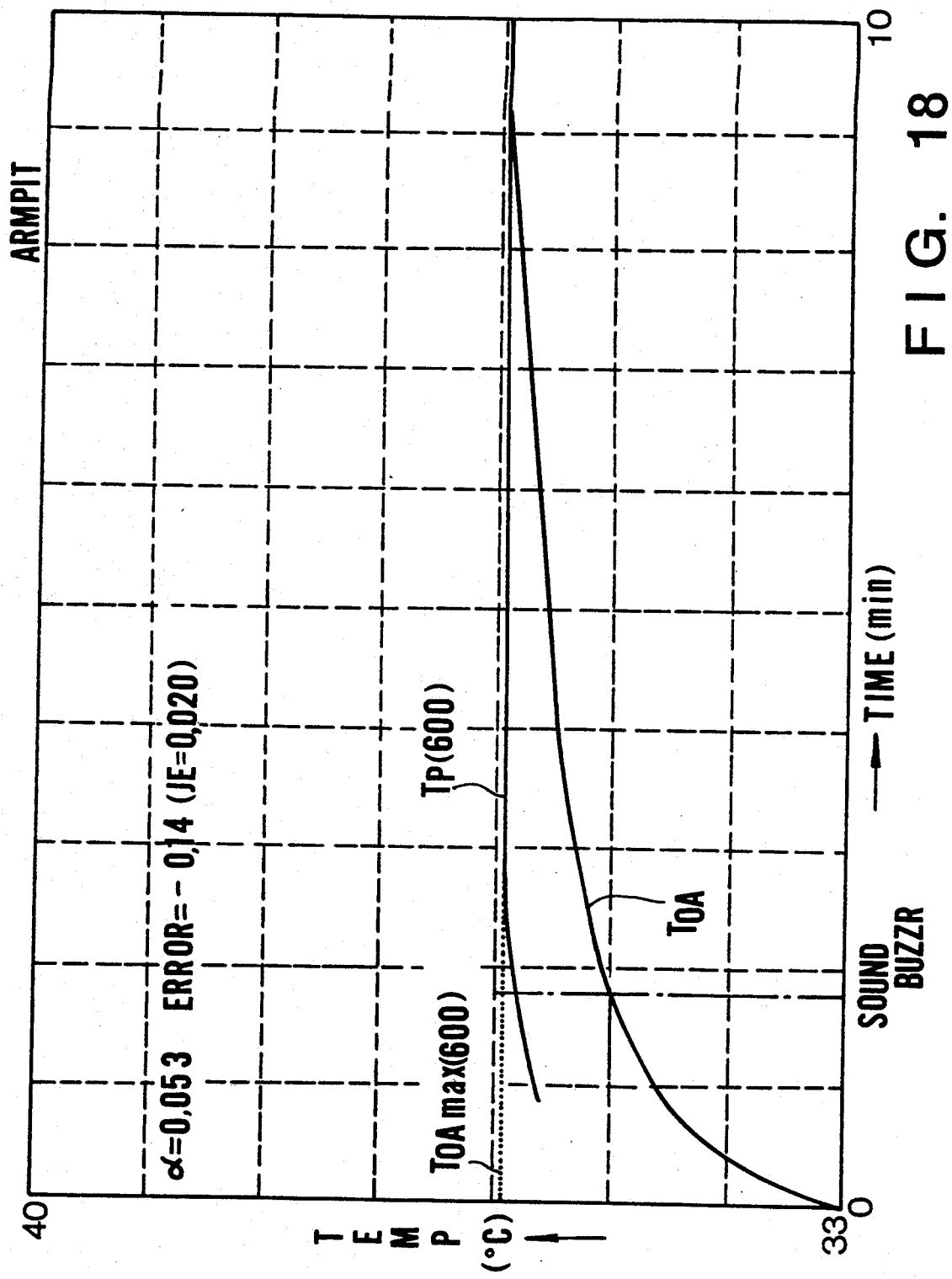
FIGS. 18 and 19 are graphs showing temperature sensed in an armpit plotted against elapsed measurement time in the electronic clinical thermometer of the second embodiment.
Figure 19:
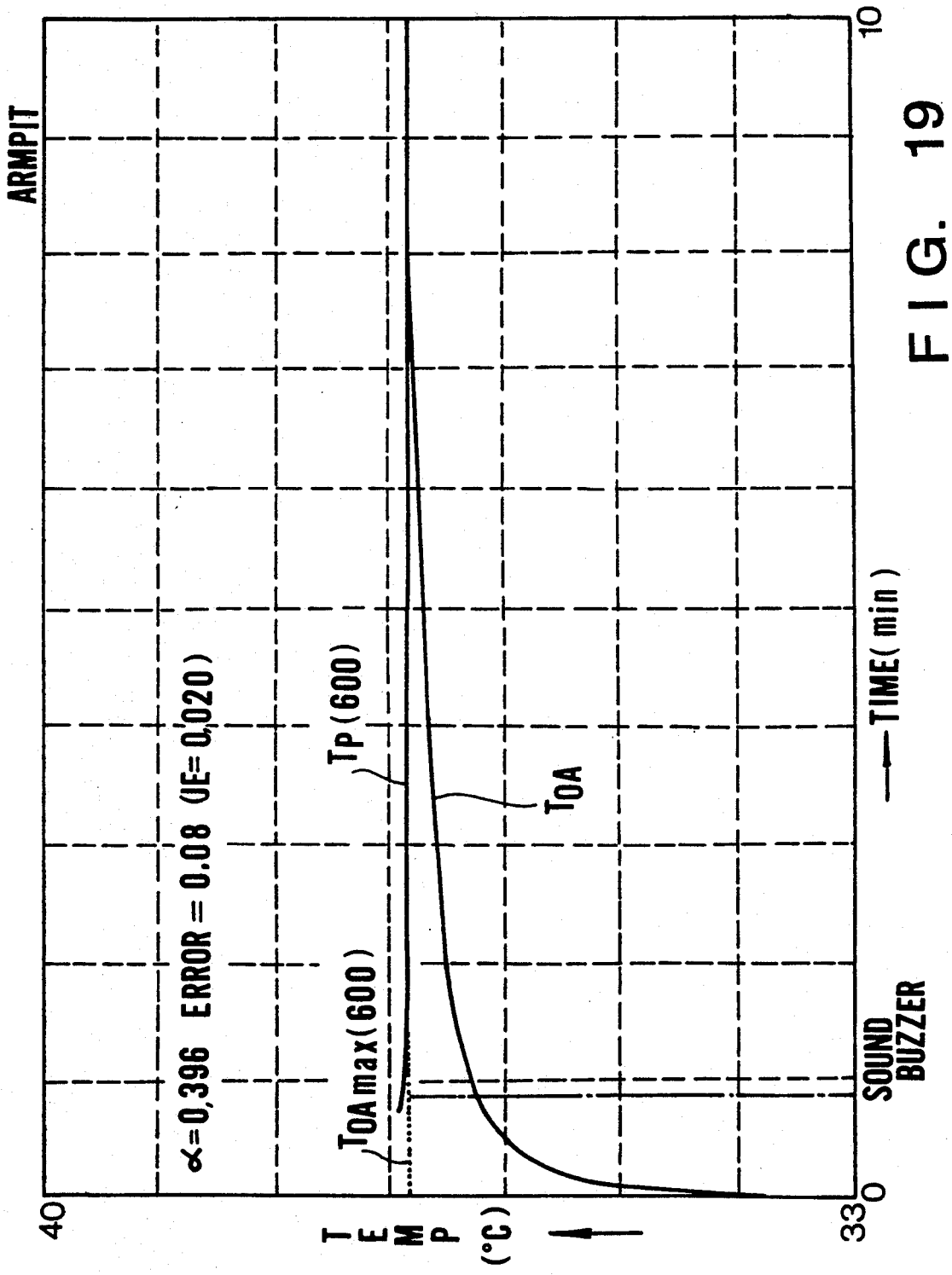

FIGS. 18 and 19 are graphs showing temperature sensed in an armpit plotted against elapsed measurement time in the electronic clinical thermometer of the second embodiment. FIG. 18 illustrates a case where the temperature rise curve ascends very gently, and FIG. 19 illustrates an average temperature rise curve. In the electronic clinical thermometer of the second embodiment, the value of the shape parameter $\alpha$ is decided at the moment the shape of a predetermined shoulder portion of the temperature rise curve is detected. Therefore, the moment at which the buzzer is sounded also varies in dependence upon a change in the rising shape of the temperature rise curve.

Figure 20:
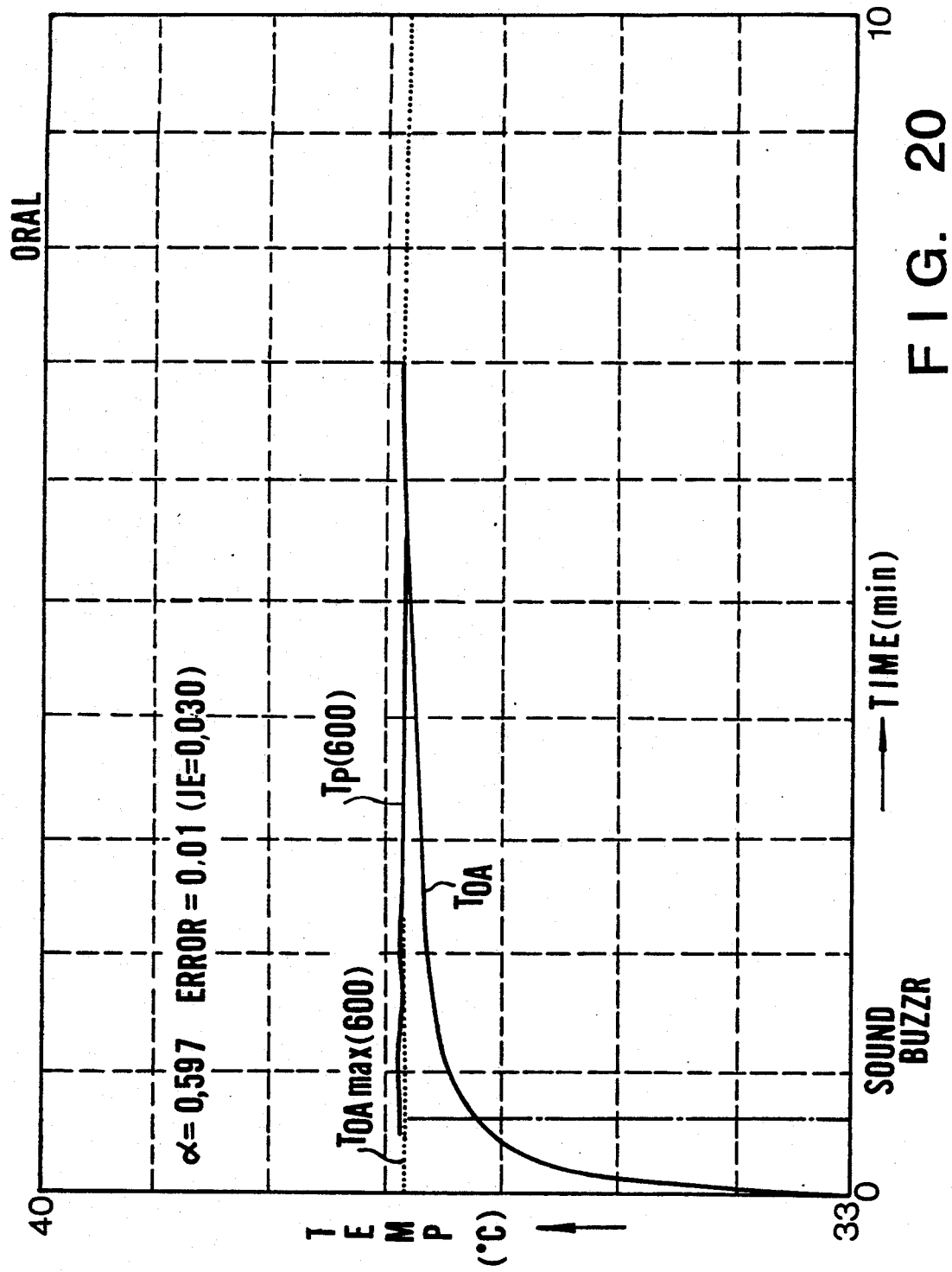
FIGS. 20 through 22 are graphs showing orally sensed temperature plotted against elapsed measurement time in the electronic clinical thermometer of the third embodiment.
Figure 21:
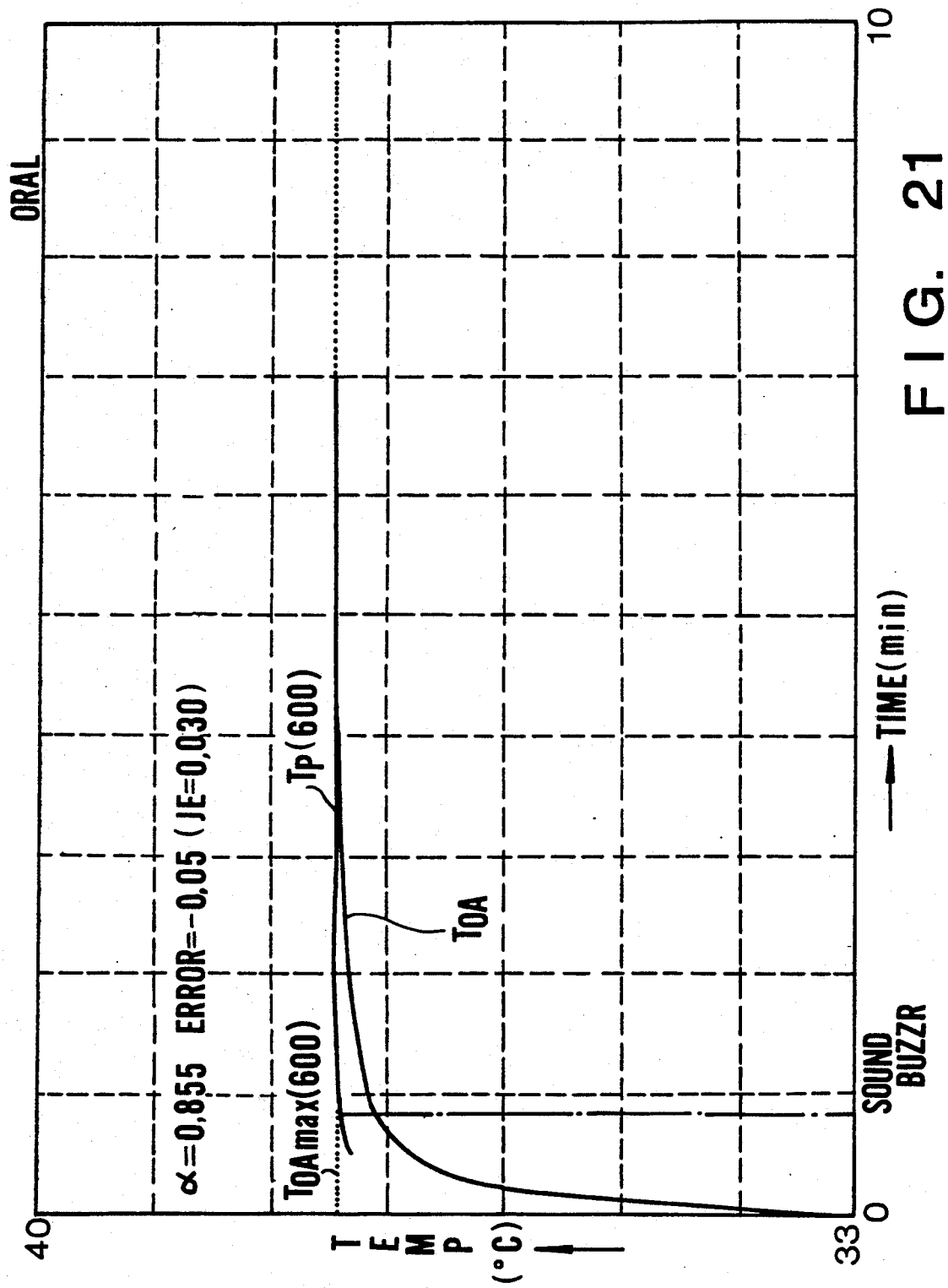
Figure 22:
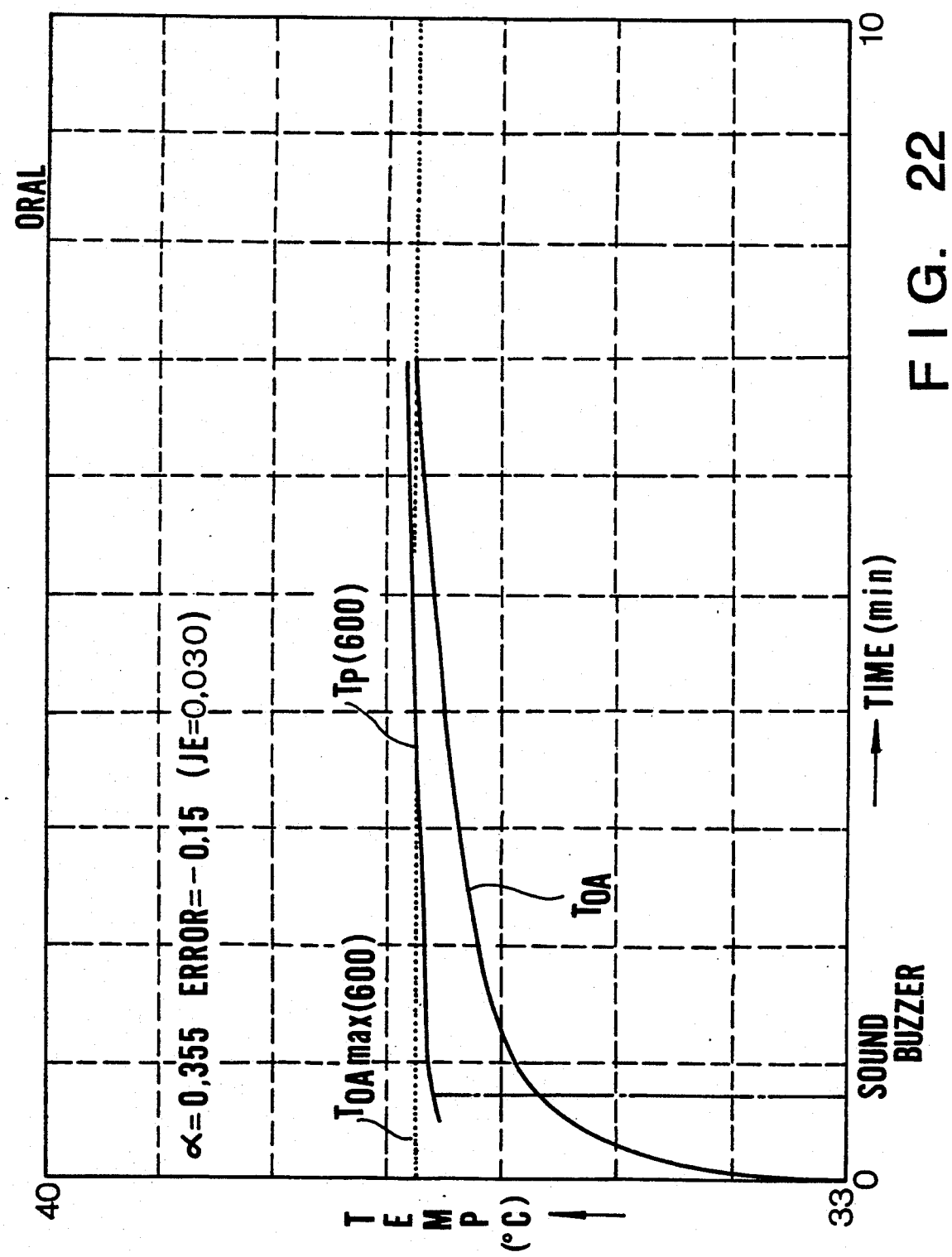

FIGS. 20 through 22 are graphs showing orally sensed temperature plotted against elapsed measurement time in the electronic clinical thermometer of the third embodiment. FIG. 20 shows an average temperature rise curve, FIG. 21 depicts a case where a temperature higher than that of FIG. 20 is measured, and FIG. 22 illustrates a case where the temperature rise curve ascends very gently. In the electronic clinical thermometer of the third embodiment, the value of the shape parameter $\alpha$ is always decided at time t=32 sec, so that the moment at which the buzzer sounds does not change much.

Though the foregoing embodiments relate to an electronic clinical thermometer used to measure the temperature of the human body, the invention or the concept thereof can readily be applied to the temperature measurement of other living bodies or to objects other than living bodies.

In the second and third embodiments of the invention, the invention is described in connection with electronic clinical thermometers adapted specifically for armpit and oral measurement, respectively. However, none of the measurement algorithms (especially the algorithms for deciding the value of shape parameter $\alpha$) are limited to armpit or oral use. In addition, measurement algorithms for armpit and oral measurement can both be incorporated in one and the same electronic clinical thermometer, which would be provided with a function enabling either of the two algorithms to be selected at will.

Furthermore, in the first and second embodiments, the comparison between the second and third slopes $S_1$, $S_2$, respectively, is expressed in terms of their ratio. However, the comparison is not limited to a ratio but can also be expressed as, say, the difference between these two slopes.

ADVANTAGES OF THE INVENTION

In accordance with the present invention as set forth hereinabove, all parameters in the prediction formula are calculated using real-time temperature data when a measurement is taken. This makes it possible to obtain an accurate, early display of temperature at all times even if sensed temperature curves differ because of a dispersion in the thermal characteristics of the probe, individual differences or differences in the part of a body where temperature is sensed.

Further, since real-time temperature data per se are used as purposive variables, there is no adverse influence ascribable to calculation error, parameters can be set stably, and predicted values do not fluctuate widely even when noise is superimposed on an actually measured temperature curve.

Moreover, temperature data are sampled as measurement proceeds in such a manner that all temperature rise curves are covered. Accordingly, even if a temperature rise curve ascends very gently, the transition of the predicted value describes a natural rise curve and there is no overshoot in the vicinity of temperature rise. This makes it possible for a measurement to be taken without the user being aware of the fact that a prediction is being made.

Since the shape of the temperature rise curve is correctly judged early in the temperature measurement operation, the predicted temperature value indicates the equilibrium temperature from the first.

Since any future time can be directly set with regard to the prediction formula, a sensed temperature value which prevails after any elapsed measurement time can be provided with ease. This also makes it possible to provide a predicted value of thermal equilibrium temperature which will prevail in the future after a very long elapsed time period.

Further, in accordance with the invention, simultaneous equations with two unknowns are solved after the value of curve shape $\alpha$ is set. Therefore, temperature data at one point can be fixed to temperature data in the vicinity of measurement start, so that it will suffice if temperature data at one other point use temperature data prevailing at the present point in time.

This makes it possible to dispense with a temperature data memory required in the prior art, and to speed up and simplify processing. Accordingly, an inexpensive, highly accurate electronic clinical thermometer having a high degree of universality can be provided.

In accordance with the invention, fluctuation in a temperature change curve caused by e.g. movement of the living body can be effectively prevented or alleviated, thereby enhancing the reliability of a predicted temperature.

Since measurement can be limited to a specific part of a living body, the accuracy of a prediction can be greatly improved.

What is claimed is:

1. A method of measuring temperature of a living body, wherein sensed temperature at a future time is capable of being predicted based on a predictive functional formula having elapsed time from the start of temperature measurement as variable, said method comprising the steps of:

providing a predictive functional formula having temperature data as independent variables and elapsed time data as dependent variables and including a shape parameter for reflecting the shape of a sensed temperature curve and coefficient parameters for superimposing said predictive functional formula on said sensed temperature curve, the value of said shape parameter and coefficient parameters being unknown;

a temperature sensing step of sensing temperature and generating temperature data indicative of the temperature sensed;

a time measuring step of measuring elapsed time from start of temperature measurement and generating time data indicative of the measured elapsed time;

setting a value of a shape parameter on the basis of said temperature data and said elapsed time data obtained early.

setting said value of coefficient parameters by solving a simultaneous equation comprising a plurality of said predictive functional formula, said plurality of predictive functional formulas being solved by substituting for said formula variables said value of shape parameter, temperature data, and elapsed time data at a plurality of different points in time; and calculating sensed temperature at a future time in accordance with the predictive functional formula specified by said value of shape parameter and coefficient parameters.

2. The method according to claim 1, wherein said predictive functional formula is $$T(t) = A_0 + A_1/t^\alpha$$

where
$A_0$ and $A_1$ : coefficient parameters
$\alpha$: shape parameter
$t$: elapsed time from the start of temperature measurement, and
$(T(t)$ : temperature on elapsed time t.

3. The method of according to claim 2, wherein said value of shape parameter $\alpha$ is set on the basis of temperature rise information obtained from a plurality of temperature data.

4. The method according to claim 3, wherein said value of shape parameter is set by detecting a point at which the sensed temperature curve exhibits a first predetermined slope, detecting a second slope $S_1$ preceding the detected point and a third slope $S_2$ following the detected point, and comparing said second and third slopes.

5. The method according to claim 4, wherein said value of shape parameter $\alpha$ is set on the basis of said second slope $S_1$ and third slope $S_2$, in accordance with the following equation:

$$\alpha = Q_1(S_1/S_2) + Q_2(S_1/S_2)^n + Q_3$$

where
n (a constant) < 1
$Q_1 - Q_3$ : constants

6. The method according to claim 2, wherein said value of shape parameter is set on the basis of plural items of temperature data at an early stage of temperature measurement following the start of measurement.

7. The method according to claim 6, wherein said value of shape parameter $\alpha$ is set on the basis of information $X_k$ based on plural items of temperature data $T_k$ at respective predetermined points in time, in accordance with the following equation:

$$\alpha = \sum_{k=0}^{4} D_k X_k + D_5$$

where
$D_0 - D_5$ constants
$X_0 - X_3$: $T_0 - T_3$
$X_4 = (X_3 - X_0)/(X_1 - X_0)$ 8. The method according to claim 1, wherein said value of coefficient parameters $A_0$, $A_1$ are set by solving the following simultaneous equations with two unknowns:

$$T(t_1) = A_0 + A_1/t_1^\alpha$$

$$T(t_2) = A_0 + A_1/t_2^\alpha$$

on the basis of temperature data $T(t_1)$, $T(t_2)$ at two different points in time and time data $t_1$, $t_2$ respectively indicative of the points in time at which the temperature is sensed.

9. The method according to claim 8, wherein said temperature data at the two different points in time are temperature data in the vicinity of measurement starting time and temperature data at a present point in time.

10. The method according to claim 1, wherein said sensed temperature $T_p(t_D)$ at a future time $t_D$ is calculated in accordance with the following equation:

$$T_p(t_D) = A_0 + A_1/t_D^\alpha$$

based on a prediction function specified by the value of shape parameter $\alpha$ and coefficient parameters $A_0$, $A_1$.

11. An apparatus for measuring the temperature of a living body, wherein sensed temperature at a future time is capable of being predicted, comprising:

memory means for storing a predictive functional formula having temperature data as independent variables and elapsed time data as dependent variable and including a shape parameter for reflecting the shape of a sensed temperature curve and coefficient parameters for superimposing said predictive functional formula on said sensed temperature curve, wherein said shape parameter and coefficient parameters are unknown;

temperature sensing means for sensing temperature and generating temperature data indicative of the temperature sensed;

time measuring means for measuring elapsed time from start of temperature measurement and generating time data indicative of the measured elapsed time;

shape parameter setting means for setting a value of shape parameter on the basis of said temperature data and elapsed time data;

coefficient parameter setting means for setting a value of coefficient parameters by solving a simultaneous equation comprising a plurality of said predictive functional formula, said plurality of predictive functional formulas being solved by substituting for said formula variables said value of shape parameter, and temperature data and elapsed time data at a plurality of different points in time; and prediction processing means for calculating sensed temperature at a future time in accordance with the predictive functional formula specified by said value of shape parameter and coefficient parameters.

12. The apparatus according to claim 11, wherein said temperature sensing means includes peak holding means for successively detecting peak levels of sensed temperature and for holding and outputting the detected peak levels.

13. The apparatus according to claim 11, wherein said temperature sensing means includes peak holding means for successively detecting peak levels of temperature sensed at a predetermined period and for holding and outputting the detected peak levels, and averaging means for obtaining and outputting a running average value of plural peak levels held by said peak holding means.

14. The apparatus according to claim 11, wherein said shape parameter setting means sets the value of shape parameter on the basis of predetermined temperature rise slope information, which is based on plural items of temperature data.

15. The apparatus according to claim 11, wherein said shape parameter setting means sets the value of shape parameter on the basis of plural items of temperature data at an early stage of temperature measurement following start of measurement.

16. The apparatus according to claim 11, wherein said coefficient parameter setting means sets the value of coefficient parameters $A_0$, $A_1$ by solving the following simultaneous equations with two unknowns:

$$T(t_1) = A_0 + A_1/t_1^\alpha$$

$$T(t_2) = A_0 + A_1/t_2^\alpha$$

on the basis of temperature data $T(t_1)$, $T(t_2)$ at two different points in time and time data $t_1$, $t_2$ respectively indicative of the points in time at which temperature is sensed.

17. The apparatus according to claim 16, wherein said coefficient parameter setting means includes using, as the temperature data at the two different points in time, temperature data in the vicinity of measurement starting time and temperature data at a present point in time.

18. The apparatus according to claim 11, wherein said prediction processing means calculates a sensed temperature $T_P(t_D)$, which will prevail at a future time $t_D$, in accordance with the following equation:

$$T_P(t_D) = A_0 + A_1/t_D^\alpha$$

based on a prediction function specified by the value of shape parameter $\alpha$ and coefficient parameters $A_0$, $A_1$.

* * * * *

UNITED STATES PATENT AND TRADEMARK OFFICE
CERTIFICATE OF CORRECTION

PATENT NO. : 5,015,102
DATED : May 14, 1991
INVENTOR(S) : Keiji YAMAGUCHI

It is certified that error appears in the above-identified patent and that said Letters Patent is hereby corrected as shown below:

Column 11, lines 21-25, in the equation -

"$...+ A_1/t_D^\alpha$" should read --$...+ A_1'/t_D^\alpha$--.

Column 13, line 50, in the equation -

"$...+ M_1 e^{m2t} +...$" should read --$...+ M_1 e^{m1t} +...$--.

Column 19, line 6, insert -- $\leq q$ -- before "does not hold".

Column 21, line 43, "A,A" should read --$A_0, A_1$--.

Column 21, line 56, insert -- ↑ -- following "(600)".

Column 24, line 33, following "shape recognition", insert --means 20 stores the value of shape parameter α obtained--.

Column 28, line 20, delete "L-".

Column 31, line 65 (claim 3), delete "of" after "method".

Signed and Sealed this

Thirteenth Day of July, 1993

Attest:

MICHAEL K. KIRK

*Attesting Officer*       *Acting Commissioner of Patents and Trademarks*